(12) United States Patent
Ham

(10) Patent No.: US 11,429,256 B2
(45) Date of Patent: Aug. 30, 2022

(54) ELECTRONIC DEVICE FOR CONTROLLING APPLICATION PROGRAM AND CONTROL METHOD THEREOF

(71) Applicant: Samsung Electronics Co., Ltd., Gyeonggi-do (KR)

(72) Inventor: Dong-Eup Ham, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/758,174

(22) PCT Filed: Oct. 24, 2018

(86) PCT No.: PCT/KR2018/012627
§ 371 (c)(1),
(2) Date: Apr. 22, 2020

(87) PCT Pub. No.: WO2019/083271
PCT Pub. Date: May 2, 2019

(65) Prior Publication Data
US 2020/0310609 A1  Oct. 1, 2020

(30) Foreign Application Priority Data
Oct. 24, 2017 (KR) .......................... 10-2017-0138716

(51) Int. Cl.
*G06F 3/0484* (2013.01)
(52) U.S. Cl.
CPC .................................. *G06F 3/0484* (2013.01)

(58) Field of Classification Search
CPC ...... G06F 3/0484; G06F 1/163; G06F 3/0488; G06F 1/1643; G06F 3/017; G06F 9/44
See application file for complete search history.

(56) References Cited

U.S. PATENT DOCUMENTS

2014/0366041 A1* 12/2014 Stanley-Marbell ... G06F 9/4825
719/318
2015/0120000 A1* 4/2015 Coffey .................... H05B 47/19
700/13
(Continued)

FOREIGN PATENT DOCUMENTS

KR   10-1402280 B1   6/2014
KR   10-2016-0070511 A   6/2016
(Continued)

*Primary Examiner* — Mong-Shune Chung
(74) *Attorney, Agent, or Firm* — Cha & Reiter, LLC.

(57) ABSTRACT

An electronic device according to various embodiments comprises: a housing; a mounting structure connected to the housing; a touchscreen display; an input interface; a processor operatively connected to the touchscreen display and the input interface; a volatile memory operatively connected to the processor; and a nonvolatile memory operatively connected to the processor, wherein the nonvolatile memory is configured to store a plurality of application programs, and may store instructions which, when executed, enables the processor to receive, from an external electronic device, data including association information between a user-related event and one or more of the application programs, store the data in the nonvolatile memory, detect the user-related event, and load the one or more application programs into the volatile memory, while a user interface of the application program is not displayed on the touchscreen display. Other embodiments are also possible.

15 Claims, 16 Drawing Sheets

(56) References Cited

U.S. PATENT DOCUMENTS

| | | | |
|---|---|---|---|
| 2015/0169051 A1* | 6/2015 | Seta | G06F 3/011 |
| | | | 345/156 |
| 2015/0253351 A1* | 9/2015 | Sadasivam | G06F 3/038 |
| | | | 702/141 |
| 2016/0150039 A1* | 5/2016 | Miettinen | H04L 67/12 |
| | | | 709/204 |
| 2016/0173679 A1 | 6/2016 | Ham et al. | |
| 2016/0179070 A1* | 6/2016 | Hwang | G05B 15/02 |
| | | | 700/83 |
| 2017/0046171 A1 | 2/2017 | Jung et al. | |
| 2017/0052665 A1 | 2/2017 | Kandregula et al. | |
| 2017/0085678 A1 | 3/2017 | Babu et al. | |
| 2017/0199814 A1* | 7/2017 | Molloy | G06F 12/0866 |
| 2017/0243195 A1 | 8/2017 | Xing | |
| 2017/0287106 A1* | 10/2017 | Liu | G06T 1/60 |
| 2017/0357495 A1* | 12/2017 | Crane | G06F 9/451 |
| 2018/0374498 A1* | 12/2018 | Nomura | G10L 25/63 |

FOREIGN PATENT DOCUMENTS

| | | |
|---|---|---|
| KR | 10-2016-0137686 A | 11/2016 |
| KR | 10-2017-0019789 A | 2/2017 |

\* cited by examiner

ELECTRONIC DEVICE FOR CONTROLLING APPLICATION PROGRAM AND CONTROL METHOD THEREOF

CLAIM OF PRIORITY

This application is a National Phase Entry of PCT International Application No. PCT/KR2018/012627, which was filed on Oct. 24, 2018, 2018 and claims a priority to Korean Patent Application No. 10-2017-0138716, which was filed on Oct. 24, 2017, the contents of which are incorporated herein by reference.

BACKGROUND

1. Field

Various embodiments relate to an electronic device for controlling an application program and a method of controlling the electronic device.

2. Description of the Related Art

As mobile electronic devices, such as smart phones, have become commonplace, the distribution of wearable electronic devices (e.g., smart watches) used in conjunction with the smart phones is rapidly increasing. A wearable electronic device may be connected to a smartphone through wired or wireless communication so as to provide a user with various functions or operations provided by the smartphone. Due to such convenience, the distribution speed of wearable electronic devices such as smart watches is gradually increasing.

A wearable electronic device may execute various application programs (also referred to as, for example, an "apps"). A wearable electronic device uses the functions of a platform of a mobile electronic device, such as a smart phone, without significantly modifying the functions of the platforms in order to execute and control the above-mentioned application programs on the wearable electronic device.

SUMMARY

A wearable electronic devices has unique characteristics different from those of a mobile electronic device due to a wearable shape, a small battery, a screen shape, a network performance relying on the mobile electronic device, and a user interface, which is short in use time but is frequently used. However, the wearable electronic device uses the functions of the platforms of the mobile electronic device without changing the functions of the platforms.

According to various embodiments, it is possible to provide an electronic device that efficiently controls an application program in consideration of characteristics of a wearable electronic device, and a method of controlling the electronic device.

According to various embodiments, it is possible to provide an electronic device that executes and controls an application program under various environments in consideration of characteristics of a wearable electronic device, and a method of controlling the electronic device.

According to various embodiments, it is possible to provide an electronic device that controls an application program for controlling an application program so as to improve performance and responsiveness by exchanging data necessary for executing an application program at a connection initialization time with another electronic device in consideration of characteristics of a wearable electronic device, and a method of controlling the electronic device.

According to various embodiments, it is possible to provide an electronic device that controls an application program so as to prevent termination of an application program necessary for a user in order to secure memory by determining a priority order of termination of the application program in consideration of the characteristics of a wearable electronic device, and a method of controlling the electronic device.

According to various embodiments, an electronic device may include: a housing, a mounting structure connected to the housing and configured to be detachably mounted on a portion of a user's body, a touch screen display exposed through a portion of the housing, an input interface located on or attached to the housing, a processor operatively connected to the touch screen display and the input interface, volatile memory operatively connected to the processor, and nonvolatile memory operatively connected to the processor. The nonvolatile memory may be configured to store a plurality of application programs, and to store instructions that, when executed, cause the processor to receive data including association information between a user-associated event and at least one application program among the application programs from an external electronic device and store the data in the nonvolatile memory, detect the user-associated event, and load the at least one application program in the volatile memory while a user interface of the application program is not being displayed on the touch screen display.

According to various embodiments, a method of controlling an application program by an electronic device may include receiving data including association information between a user-associated event and at least one application program among a plurality of application programs from an external electronic device, detecting the user-associated event, and loading the at least one application program in volatile memory included in the electronic device while a user interface of the application program is not being displayed on the touch screen display included in the electronic device.

According to various embodiments, in a storage medium storing instructions, the instructions are configured to cause, when executed by at least one circuit, the at least one circuit to perform one or more operations, and the one or more operations may include an operation of receiving data including association information between a user-associated event and at least one application program among a plurality of application programs from an external electronic device, an operation of detecting the user-associated event, and an operation of loading the at least one application program in a volatile memory while a user interface of the application program is not being displayed on a touch screen display.

In various embodiments, it is possible to efficiently control an application program in consideration of the characteristics of a wearable electronic device.

In various embodiments, it is possible to execute and control an application program operable under various environments in consideration of the characteristics of a wearable electronic device.

In various embodiments, it is possible to improve performance and responsiveness by exchanging data necessary for executing an application program at a connection initialization time with another electronic device in consideration of the characteristics of a wearable electronic device.

In various embodiments, it is possible to prevent system performance from being degraded (sluggish) by preventing termination of an application program necessary for the user in order to secure memory by determining a priority order of termination of the application program in consideration of the characteristics of a wearable electronic device.

DETAILED DESCRIPTION

Figure 1:
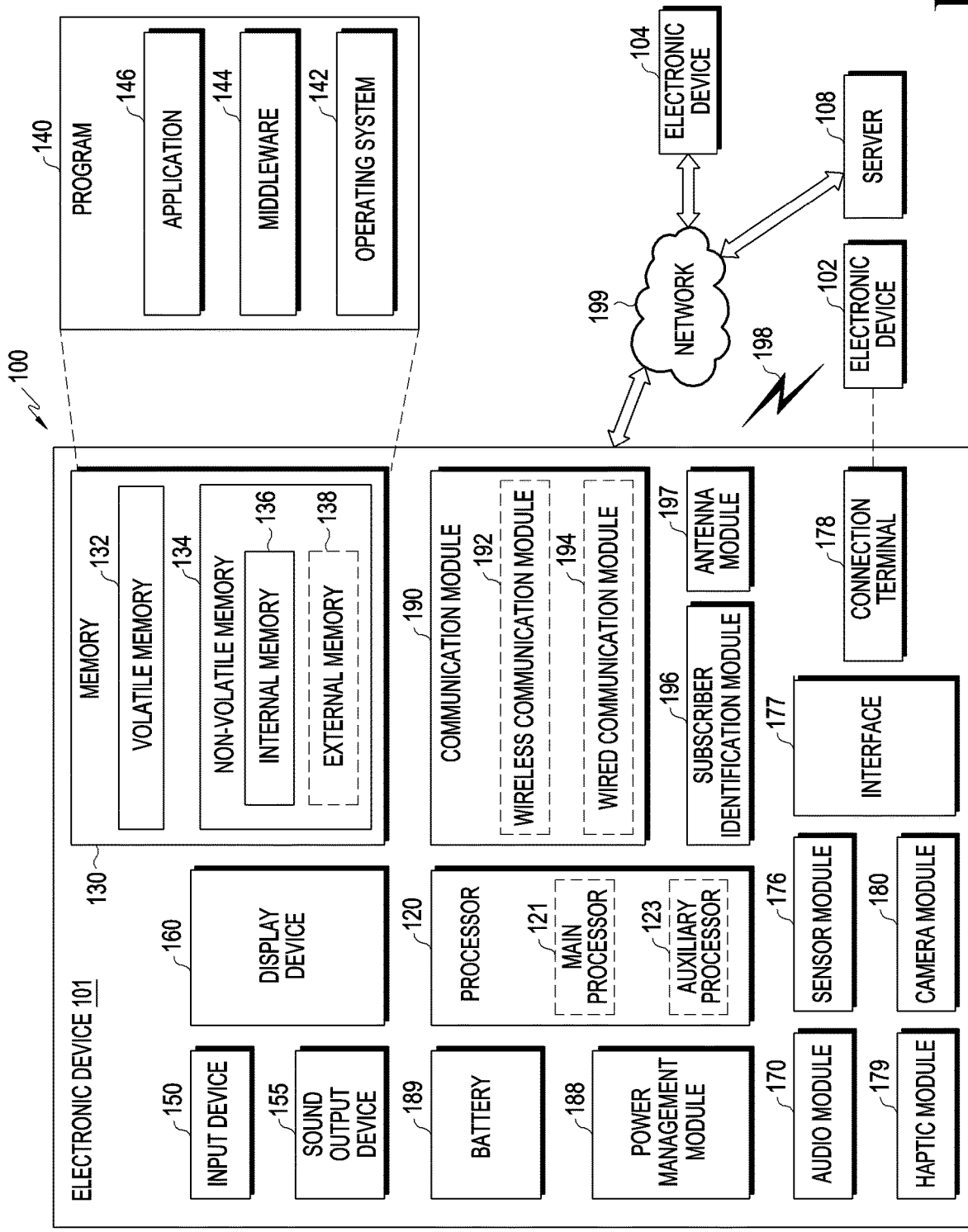
FIG. 1 is a block diagram of an electronic device according to various embodiments in a network environment.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., short-range wireless communication), or an electronic device 104 or a server 108 via a second network 199 (e.g., long-range wireless communication). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one (e.g., the display device 160 or the camera module 180) of the components may be omitted from the electronic device 101, or one or more other components may be added in the electronic device 101. In some embodiments, some of the components may be implemented in an integrated from as in the case of the sensor module 176 (e.g., a fingerprint sensor, an iris sensor, or an illuminance sensor), which is embedded in the display device 160 (e.g., a display).

The processor 120 may control one or more other components (e.g., a hardware or software component) of the electronic device 101, which are connected to the processor 120, and may perform various data processing and arithmetic operations by driving, for example, software (e.g., a program 140). The processor 120 may load commands or data, which are received from other components (e.g., the sensor module 176 or the communication module 190), into volatile memory 132 so as to process the commands or data, and may store the resultant data in nonvolatile memory 134. According to an embodiment, the processor 120 may include a main processor 121 (e.g., a central processing unit or an application processor), and an auxiliary processor 123 (e.g., a graphics processing unit, an image signal processor, a sensor hub processor, or a communication processor) that is operable independently from the main processor 123, additionally or alternatively uses power lower than that of the main processor 121, or is specialized for a designated function. Here, the auxiliary processor 123 may be operated separately from the main processor 121 or in the state of being embedded in the main processor 121.

In this case, the auxiliary processor 123 may control at least some functions or states associated with at least one of the components (e.g., the display device 160, the sensor module 176, or the communication module 190) of the electronic device 101, on behalf of the main processor 121, for example, while the main processor 121 is in an inactive (e.g., sleep) state, or together with the main processor 121 while the main processor 121 is in an active (e.g., application execution) state. According to an embodiment, the auxiliary processor 123 (e.g., an image signal processor or a communication processor) may be implemented as some of other functionally related components (e.g., the camera module 180 or the communication module 190). The memory 130 may store various data used by at least one component (e.g., the processor 120 or the sensor module 176) of electronic device 101, for example, software (e.g., the program 140) and input or output data for commands associated therewith. The memory 130 may include the volatile memory 132 or the nonvolatile memory 134.

The program 140 may be software stored in the memory 130, and may include, for example, an operating system 142, middleware 144, or applications 146.

The input device 150 is a device for receiving, from the outside (e.g., the user) of the electronic device 101, instructions or data to be used in a component (e.g., the processor 120) of the electronic device 101, and may include, for example, a microphone, a mouse, or a keyboard.

The sound output device 155 is a device for outputting a sound signal to the outside of the electronic device 101, and may include, for example, a speaker used for general use such as multimedia reproduction or recorded sound reproduction and a receiver used only for telephone reception. According to an embodiment, the receiver may be implemented integrally with or separately from the speaker.

The display device 160 is a device for visually providing information to a user of the electronic device 101, and may include, for example, a display, a hologram device, or a projector and a control circuit for controlling the corresponding device. According to an embodiment, the display device 160 may include a touch circuit or a pressure sensor capable of measuring the intensity of a touch pressure.

The audio module 170 may bidirectionally convert sound and electrical signals. According to an embodiment, the audio module 170 may acquire sound via the input device 150 or may output sound via the sound output device 155 or an external electronic device (e.g., the electronic device 102 (e.g., a speaker or a headphone)) connected with the electronic device 101 in a wireless or wired manner.

The sensor module 176 may generate an electrical signal or a data value corresponding to an internal operating state (e.g., power or temperature) of the electronic device 101 or an external environmental state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a designated protocol capable of being connected to an external electronic device (e.g., the electronic device 102) in a wired or wireless manner. According to an embodiment, the interface 177 may include a high-definition multimedia interface (HDMI), a universal serial bus (USB) interface, an SD card interface, or an audio interface.

The connection terminal 178 may include a connector capable of physically interconnecting the electronic device 101 and an external electronic device (e.g., the electronic device 102), such as an HDMI connector, a USB connector, an SD card connector, or an audio connector (e.g., a headphone connector).

The haptic module 179 may convert an electrical signal into a mechanical stimulus (e.g., vibration or motion) or an electrical stimulus that may be perceived by the user through a tactile or kinesthetic sense. The haptic module 179 may include, for example, a motor, a piezoelectric element, or an electrical stimulation device.

The camera module 180 is capable of capturing a still image and a video image. According to an embodiment, the camera module 180 may include one or more lenses, an image sensor, an image signal processor, or a flash.

The power management module 188 is a module for managing power supplied to the electronic device 101, and may be configured as at least part of, for example, a power management integrated circuit (PMIC).

The battery 189 is a device for supplying power to at least one component of the electronic device 101, and may include, for example, a non-rechargeable primary battery, a rechargeable secondary battery, or a fuel cell.

The communication module 190 may establish a wired or wireless communication channel between the electronic device 101 and an external electronic device (e.g., the electronic device 102, the electronic device 104, or the server 108), and may support communication via the established communication channel. The communication module 190 may include a processor 120 (e.g., an application processor) and one or more communication processors, which are independently operated and support wired communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module), and may communicate with an external electronic device via a first network 198 (e.g., a short-range communication network, such as Bluetooth, Wi-Fi direct, or Infrared Data Association (IrDA)) or a second network 199 (e.g., a long-range communication network, such as a cellular network, the Internet, or a computer network (e.g., a LAN or a WAN)), using a corresponding communication module among the above-mentioned communication modules. Various types of communication modules 190 described above may be implemented as a single chip, or may be implemented as separate respective chips.

According to an embodiment, the wireless communication module 192 may identify and authenticate the electronic device 101 within the communication network using the user information stored in the subscriber identification module 196.

The antenna module 197 may include one or more antennas configured to transmit/receive signals or power to/from the outside. According to an embodiment, a communication module 190 (e.g., the wireless communication module 192) may transmit/receive signals to/from an external electronic device via an antenna suitable for the communication scheme thereof.

Among the components described above, some components may be connected to each other via a communication scheme (e.g., a bus, a general purpose input/output (GPIO), a serial peripheral interface (SPI), or a mobile industry processor interface (MIPI)), and may exchange signals (e.g., instructions or data) therebetween.

According to an embodiment, the instructions or data may be transmitted or received between the electronic device 101 and the external electronic device 104 via the server 108 connected to the second network 199. Each of the electronic devices 102 and 104 may be of a type, which is the same as or different from the electronic device 101. According to an embodiment, all or some of the operations executed in the electronic device 101 may be executed in another external electronic device or a plurality of external electronic devices. According to an embodiment, in the case where the electronic device 101 should perform a certain function or service automatically or in response to a request, the electronic device 101 may request some functions, which are associated with the function or service, from an external electronic device, instead of, or in addition to, executing the functions or the service by itself. The external electronic device, which receives the request, may execute the requested function or an additional function, and may transmit the results to the electronic device 101. The electronic device 101 may provide the requested function or service using the received results as they are or by additionally processing the received results. For this purpose, for example, a cloud computing technology, a distributed computing technology, or a client-server computing technology may be used.

Figure 2:
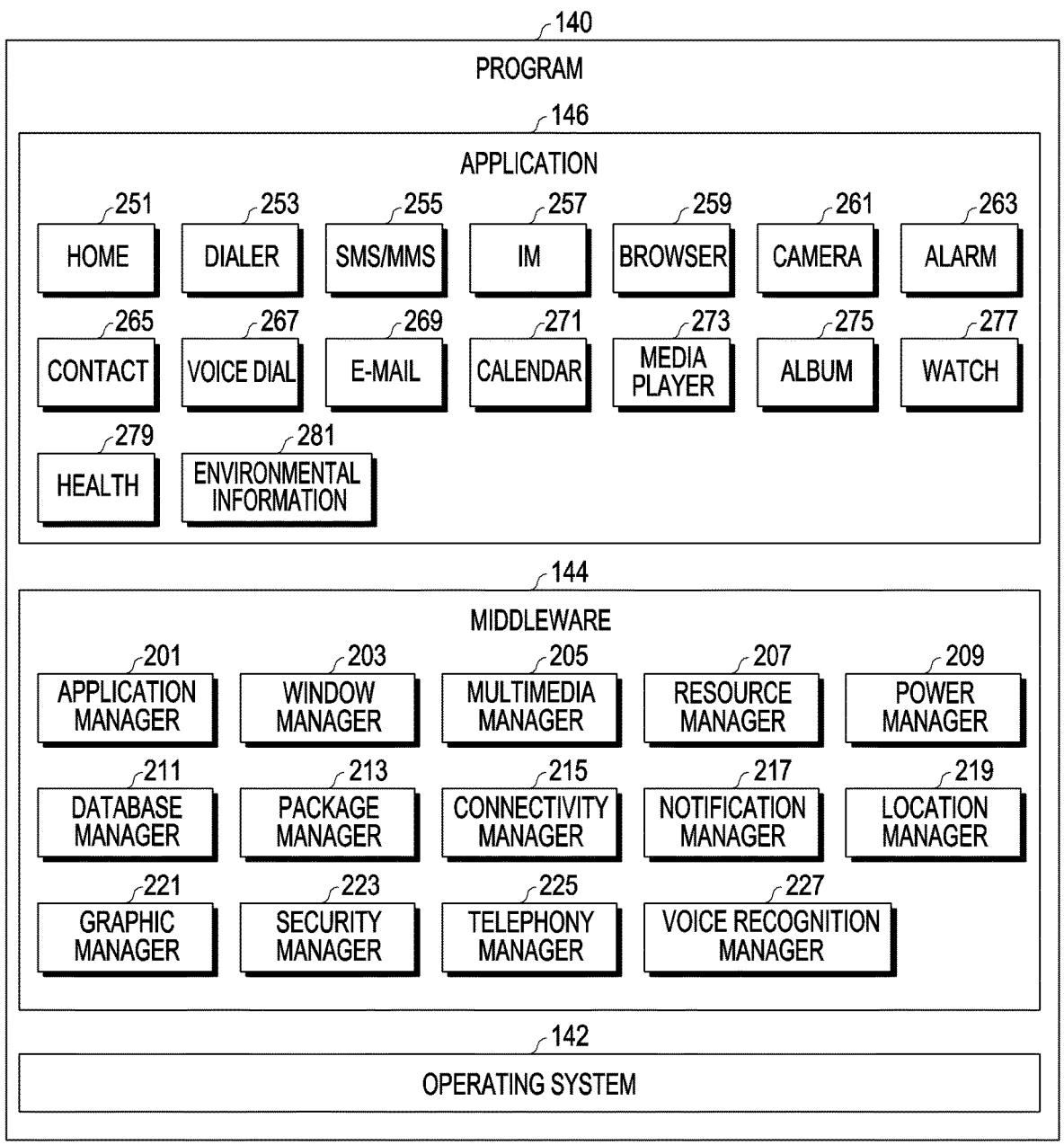
FIG. 2 is a block diagram of a program according to various embodiments.

FIG. 2 is a block diagram 200 of programs 140 according to various embodiments. According to one embodiment, the programs 140 may include an operating system 142 for controlling one or more resources of the electronic device 101, middleware 144, or applications 146 executable on the operating system 142. The operating system 142 may include, for example, Android™ iOS™, Windows™, Symbian™, Tizen™, or Bada™. At least some of the programs 140 may be, for example, preloaded in the electronic device 101 at the time of manufacture, or may be downloaded or updated from an external electronic device (e.g., the electronic device 102 or 104 or the server 108) or updated in the use environment of the user.

The operating system 142 may control (e.g., allocate or recover) system resources (e.g., a process, memory, or a power supply) of the electronic device 101. The operating system 142 may additionally or alternatively include one or more driver programs for driving other hardware devices (e.g., an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197) of the electronic device 101.

The middleware 144 may provide various functions to the applications 146 such that the applications 146 are capable of using the functions or information provided by the one or more resources of the electronic device 101. The middleware 144 may include, for example, an application manager 201, a window manager 203, a multimedia manager 205, a resource manager 207, a power manager 209, a database manager 211, a package manager 213, a connectivity manager 215, a notification manager 217, a location manger 219, a graphic manager 221, a security manager 223, a telephony manager 225, or a voice recognition manager 227. The application manager 201 may manage, for example, the life cycles of the applications 146. The window manager 203 may manage, for example, a GUI resource that is used in a screen. The multimedia manager 205 may grasp, for example, a format required for reproducing various media files, and may perform encoding or decoding of the media files using a codec that is suitable for the corresponding format. The resource manager 207 may manage, for example, a source code of the applications 146 or a memory space. The power manager 209 may manage, for example, the capacity, temperature, or power of a battery, and may determine or provide power information required for operating the electronic device 101 using the corresponding information. According to an embodiment, the power manager 209 may be interlocked with a basic input/output system (BIOS).

The database manager 211 may generate, retrieve, or change, for example, a database to be used by the applications 146. The package manager 213 may manage, for example, the installation or update of an application that is distributed in the form of a package file. The connectivity manager 215 may manage, for example, a wireless connection or a wired connection between the electronic device 101 and the external electronic device. The notification manager 217 may provide, for example, a function for notifying a user of a generated event (e.g., a call, a message, or an alarm). The location manager 219 may manage, for example, position information of the electronic device 101. The graphic manager 221 may manage, for example, a graphic effect to be provided to the user or a user interface associated therewith. The security manager 223 may provide, for example, system security or user authentication. The telephony manager 225 may manage, for example, a voice call or video call function of the electronic device 101. The voice recognition manager 227 may transmit, for example, the voice data of the user to the server 108 and may receive an instruction corresponding to the function to be performed in the electronic device 101 or character data converted on the basis of the corresponding voice data. According to an embodiment, the middleware 144 may dynamically delete some of the existing components or add new components. According to an embodiment, at least part of the middleware 144 may be included as part of the operating system 142, or may be implemented as software separate from the operating system 142.

The applications 146 may include, for example, a home application 251, a dialer application 253, an SMS/MMS application 255, an instant message (IM) application 257, a browser application 259, a camera application 261, an alarm application 263, a contact application 265, a voice recognition application 267, an e-mail application 269, a calendar application 271, a media player application 273, an album application 275, and a watch application 277, health care information application 279 (e.g., motion quantity or blood sugar measurement application), or environmental information application 281 (e.g., atmospheric pressure, humidity, or temperature information application). According to an embodiment, the applications 146 may further include an information exchange application (not illustrated), which may support information exchange between the electronic device 101 and an external electronic device. The information exchange application may include, for example, a notification relay application configured to transmit designated information (e.g., a call, a message, or an alarm) to an external electronic device, or a device management application configured to manage the external electronic device. The notification relay application may transmit, for example, notification information corresponding to an event (e.g., mail reception) generated in another application (e.g., the email application 269) of the electronic device 101 to an external electronic device, or may receive notification information from an external electronic device and provide the notification information to the user of the electronic device 101. The device management application may control, for example, the power supply (e.g., turn-on or turn-off) of an external electronic device that communicates with the electronic device 101 or some of the components (e.g., the display device 160 or the camera module 180) or a function (e.g., brightness, resolution, or focus of the display device 160 or the camera module 180) thereof. The device management application may additionally or alternatively support the installation, deletion, or update of an application executed in an external electronic device.

An electronic device according to various embodiments disclosed herein may be any of various types of devices. The electronic device may include at least one of, for example, a portable communication device (e.g., a smart phone), a computer device, a portable multimedia device, a portable medical device, a camera, a wearable device, or a home appliance. The electronic device according to an embodiment disclosed herein is not limited to the above-described devices.

It should be appreciated that various embodiments and terms used therein are not intended to limit the technological features set forth herein to particular embodiments and that various changes, equivalents, and/or replacements for a corresponding embodiment. With regard to the description of the drawings, similar components may be denoted by similar reference numerals. A singular expression may include a plural expression unless otherwise apparently define the meaning. Herein, the terms, such as "A or B", "at least one of A and B", "A, B, or C", and "one or more of A, B, and C", may include all possible combinations of items listed with the terms. The terms, such as "$1^{st}$", "$2^{nd}$", "first", and "second", may modify various constituent elements regardless of order or importance, and are merely used in order to differentiate one constituent element from another constituent element without limiting the corresponding constituent elements. When it is described that a certain component (e.g., a first component) is "(functionally or communicatively) connected to" or "connected to" another component (e.g., a second component), the first component may be connected to the second component directly or via another component element (e.g., a third component).

The term used herein "module" may include a unit configured with hardware, software, or firmware, and may be used interchangeably with a term such as "logic", "logic block", "part", or "circuit". The "module" may be an integrally configured component or a minimum unit or a part thereof that performs one or more functions. For example, the module may be configured as an application-specific integrated circuit (ASIC).

Various embodiments disclosed herein may be implemented by software (e.g., a program 140) including instructions stored in a storage medium readable by a machine (e.g., a computer) (a machine-readable storage medium) (e.g., internal memory 136 or external memory 138). The machine is a device capable of calling stored instructions from the storage medium and capable of operating according to the called instructions, and may include an electronic device (e.g., the electronic device 101) according to the embodiments disclosed herein. When the instructions are executed by a processor (e.g., a processor 120), the processor may perform the functions corresponding to the instructions, either directly or using other components under the control of the processor. The instructions may include codes generated or executed by a compiler or an interpreter. The machine-readable storage medium may be provided in the form of a non-transitory storage medium. Here, the term "non-temporary" means that the storage medium does not include a signal and is tangible, but does not distinguish between where data is semi-permanently stored in the storage medium and where the data is temporarily stored in the storage medium.

According to an embodiment, a method according to various embodiments disclosed herein may be included and provided in a computer program product. A computer program product may be traded as a product between a seller and a purchaser. The computer program product may be distributed in the form of a machine-readable storage medium (e.g., a compact disc read only memory (CD-ROM)), or may be distributed online via an application store (e.g., Play Store™). When distributed online, at least part of the computer program product may be temporarily stored in or temporarily generated from a storage medium, such as memory of a manufacturer's server, a server of an application store, or a relay server.

According to various embodiments, each component (e.g., a module or a program) may be configured as a single entity or multiple entities, and some of the aforementioned sub-components may be omitted, or one or more other sub-components may be further included in various embodiments. Alternatively or additionally, some components (e.g., a module or a program) may be integrated as a single entity, and may perform the functions performed of each of the plurality of components in the same or similar manner as the functions are performed by a corresponding one of the plurality of components before the integration. According to various embodiments, operations performed by a modules, a program modules, or another component may be carried out sequentially, in parallel, repeatedly, or heuristically, one or more of the operations may be executed in a different order or omitted, or one or more other operations may be added thereto.

Figure 3:
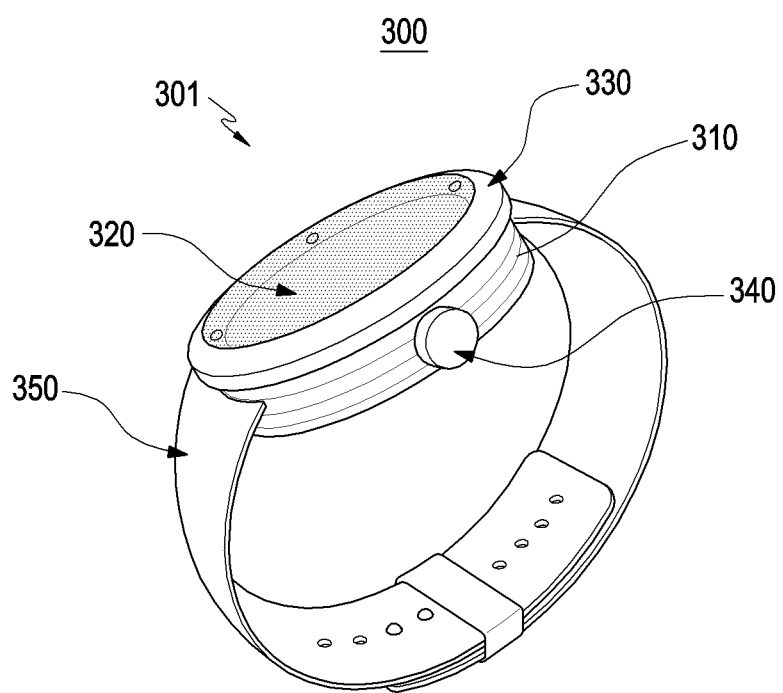
FIG. 3 is a perspective view illustrating a wearable electronic device according to various embodiments.

FIG. 3 is a perspective view 300 illustrating a wearable electronic device according to various embodiments.

Referring to FIG. 3, a wearable electronic device 301 (e.g., the electronic device 101) may include a housing 310, a touch screen display 320 (e.g., the display device 160) exposed through a portion of the housing 310, a wheel input interface 330 located on the housing 310, a watch crown input interface 340 attached to the housing 310, and a mounting structure 350 connected to the housing 310 and configured to be detachably mounted on a portion of the user's body.

According to various embodiments, a case where the wearable electronic device 301 is a wearable electronic device in the form of a watch is described as an example, but the wearable electronic device is not limited thereto. Various types of wearable electronic devices capable of being detachably mounted on a portion of the user's body may be possible.

The touch screen display 320 may include a touch panel configured to detect a touch input, and may detect a user input (e.g., touch or hovering).

The wheel input interface 330 is rotatably disposed around the touch screen display 320 on the housing 310, and may be an input interface configured to control the touch screen display 320. For example, the display of an object output through the touch screen display 320 may be controlled depending on the rotation amount, rotation direction, or rotation speed of the wheel input interface 330.

The watch crown input interface 340 is rotatably attached to one side of the housing 310, is fixed to one end of a crown rotation shaft, and is capable of rotating around the crown rotation shaft. The watch crown input interface 340 may be an input interface configured to control the touch screen display 320. For example, the display of an object output through the touch screen display 320 may be controlled depending on the rotation amount, rotation direction, or rotation speed of the watch crown input interface 340.

The mounting structure 350 may be configured in the form of a band (or strap) for fixing the housing 310 to the user's wrist.

Figure 4:
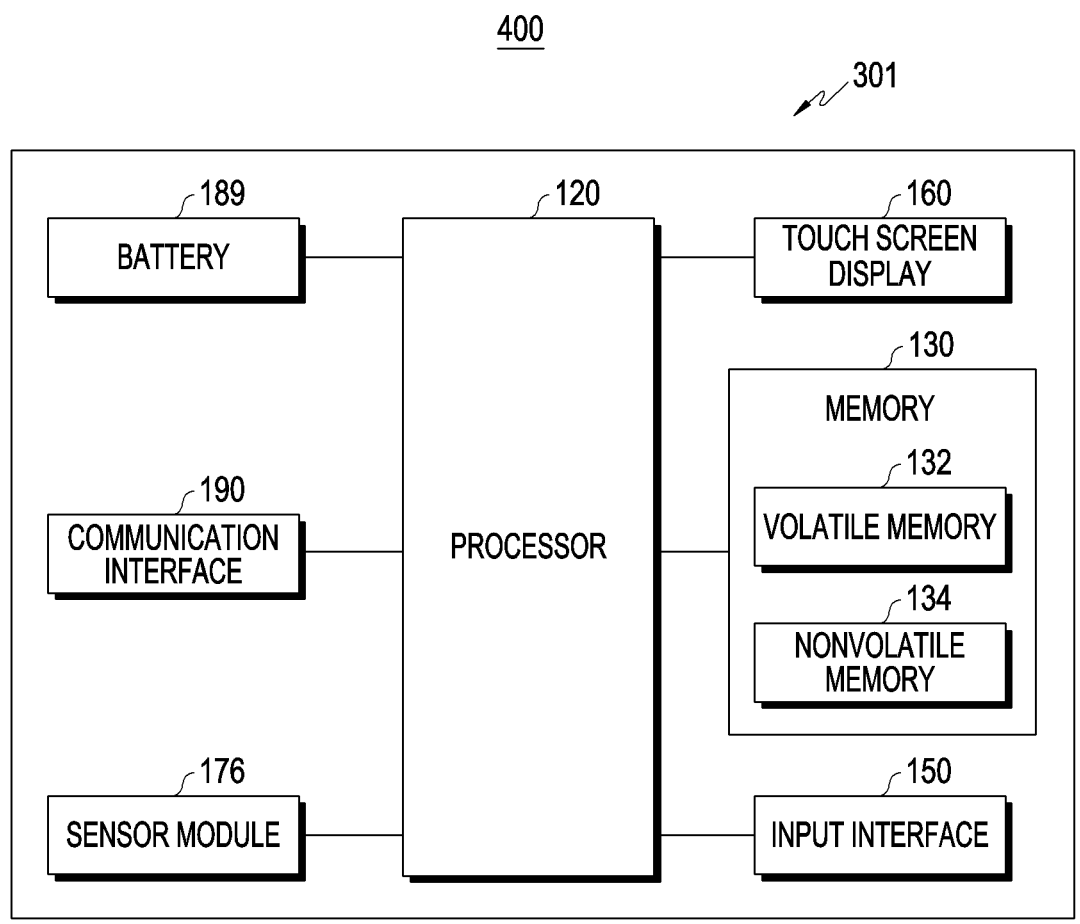
FIG. 4 is a block diagram of a wearable electronic device according to various embodiments.

FIG. 4 is a block diagram 400 of a wearable electronic device according to various embodiments.

Referring to FIG. 4, the wearable electronic device 301 (e.g., the electronic device 101) may include a processor 120, memory 130, an input interface 150 (e.g., the wheel input interface 330 or the watch crown input interface 340), a touch screen display 160 (e.g., the display device 160), a sensor module 176, a battery 189, and a communication interface 190 (e.g., the communication module 190). The processor 120, the memory 130, the input interface 150, the touch screen display 160, the sensor module 176, and the communication interface 190 included in the wearable electronic device 301 may be connected to each other so as to exchange signals (e.g., instructions or data).

The memory 130 may store instructions or data associated with the operations of the components included in the wearable electronic device 301. The memory 130 may include volatile memory 132 and nonvolatile memory 134, and the nonvolatile memory 134 may store a plurality of application programs (e.g., the application programs 145) and an inference framework (e.g., the inference framework 501 in FIG. 5) for controlling the application programs by the wearable electronic device 301. The nonvolatile memory 134 may receive data including association information (e.g., inference learning data) between a user association event and at least one of the application programs from an external electronic device (e.g., the server 108 and the electronic devices 102 and 104), and may store the data. In addition, the volatile memory 132 may load at least one of the application programs while the user interface of the application program is not displayed on the touch screen display 160. In addition, for example, the memory 130 may store instructions that, when executed, cause the processor 120 to perform various operations described herein.

The input interface 150 may be rotated clockwise or counterclockwise by the user's manipulation, and may be configured in various forms (e.g., a bezel, a crown, and a wheel scroll) to detect rotation input information. For example, the input interface 150 may include a wheel input interface (e.g., the wheel input interface 330 in FIG. 3) or a watch crown input interface (e.g., the watch crown input interface 340 in FIG. 3). In addition, the input interface 150 may detect a user-associated event by the user's manipulation.

The touch screen display 160 may receive processed data from the processor 120, and may display the received data. The touch screen display 160 may display a user interface for application programs. The touch screen display 160 may display a watch face screen, a home screen, a widget screen associated with application programs, and a notification screen associated with a notification. In addition, the touch screen display 160 may display a screen changed depending on a user-associated event by the user's manipulation via the input interface 150.

The touch screen display 160 may receive the user's touch input. The touch screen display 160 may detect a change in physical quantity by a touch circuit including a touch sensor and a touch sensor IC, and may calculate a position (X, Y) where a touch is made based on the change in physical quantity (e.g., voltage, resistance, or capacitance). The calculated position (coordinates) may be provided (or reported) to the processor 120.

The sensor module 176 may include a plurality of sensors, and the sensor module 176 may detect a motion of the wearable electronic device 301, which is caused by a user wearing the wearable electronic device 301, through a plurality of sensors. Each sensor may output detected information to the processor 120, and the processor 120 may detect the motion of the wearable electronic device 301 through the detected information. The sensor module 176 may detect a user-associated event due to the motion of the wearable electronic device 301.

The battery 189 may supply power to the components (e.g., the processor 120, the memory 130, the input interface 150, the touch screen display 160, the sensor module 176, the battery 189, and the communication interface 190) included in the housing (e.g., the housing 310 in FIG. 3) under the control of the processor 120.

The communication interface 190 may perform, for example, communication between the wearable electronic device 301 and an external device (e.g., the server 108 or an electronic device 102 or 104). For example, the communication interface 190 may be connected with a network through wired or wireless communication so as to communicate with an external device (e.g., the electronic device 102, the electronic device 104, or the server 108 in FIG. 1). The communication interface 190 may support a local area network with an external electronic device located within a predetermined distance (e.g., Bluetooth (BT) or a Wi-Fi network). The communication interface 190 may not support a wide area network (WAN), and may be connected to the wide area network depending on external electronic devices connected via a local area network. The communication interface 190 may be connected to a first external electronic device (e.g., a mobile terminal) using a first network (e.g., a local area network), and may perform information exchange (capability information) for synchronization with the connected first external electronic device. In addition, the communication interface 190 may download an application program from a second external electronic device (e.g., a web server or a cloud server) using the first external device and a web proxy function or using a second network (e.g., a wide area network) via the first external electronic device, or may receive data including association information between the user-associated event and at least one of the application programs. In addition, while synchronization with the first external electronic device is being performed, the communication interface 190 may receive data associated with at least one application program from the second external electronic device (e.g., a web server) using the second network (e.g., a wide area network) via the first external electronic device.

The processor 120 may control the overall operation of the wearable electronic device 301. The processor 120 may receive data including association information (e.g., inference learning data) between a user-associated event and at least one of the application programs from an external electronic device (e.g., a server or a mobile terminal) by controlling the communication interface 190, and may store the data in the nonvolatile memory 134. The association information included in the data may be information about an association between an application program and user-associated events collected from various users from external electronic devices (e.g., a web server and a cloud server). For example, an external electronic device may collect information about the frequency of execution of an application program, information about the number of times of execution of the application program for a predetermined period (e.g., one week), information about user-related events associated with the execution of the application program, and the like from various users, and may generate the association information. The association information generated by the external electronic device is based on statistics of general user patterns, and may be different from the user pattern of each individual user. The association information may be information associated with the execution of the application program, and the user-associated events may be associated with the touch screen display 160 or the input interface 150. The association information may include the execution frequency of an application program executed in response to a user-associated event associated with a user input directly input by the user via the touch screen display 160 or the input interface 150. For example, the association information may include an association with an application program executed in response to a user-associated event including rotation input information input according to the rotation of the input interface 150. Alternatively, the association information may include an association with an application program executed in response to a user-associated event including touch input information input according to the touch of the touch screen 160. In addition, the association information may include the execution frequency of an application program executed in response to a user-associated event associated with information collected by the wearable electronic device 301. For example, the association information may include an association with an application program executed in response to a user-associated event including the time selected in association with one day (e.g., morning, noon, and evening), the time selected for the day of the week (e.g., Monday, Tuesday, Wednesday, . . . , Holiday), and the time selected in association with the year (e.g., 2017, 2018, and event-scheduled year), and the time selected in association with seasons (e.g., spring, summer, fall, and winter). Alternatively, the association information may include an association with an application program executed in response to a user-associated event including motion information detected by the wearable electronic device 301. For example, the association information may include an association with an application program executed in response to a user-associated event including an exercise motion of the user (e.g., running or walking), a resting motion of the user (e.g., sitting, standing, or sleeping), and a motion for riding in a vehicle. Alternatively, the association information may include an association with an application program executed in response to a user-associated event associated with the information about the state of the wearable electronic device 301. For example, the association information may include an association with an application program executed in response to a user-associated event including the occurrence of a notice (e.g., a notice of receipt of a message, a phone call, or the like) and the occurrence of a notification (e.g., a notification of low battery, low memory, or the like).

The processor 120 may detect a user-associated event associated with the execution of an application program using components (e.g., the input interface 150, the touch screen display 160, the sensor module 176, and the communication interface 190) included in the wearable electronic device 301. User-associated events may include events associated with the touch screen 160 or the input interface 150, and the user-associated events associated with the touch screen display 160 may include touch input events on a touch screen display, for example, tap, double-tap, drag, slide, hold/press, swipe, rotation, press and drag, pinch, spread, and the like. In addition, user-associated events associated with the input interface 150 may include rotation input events of a wheel input interface (e.g., the wheel input interface 330 in FIG. 3) or a watch crown input interface (e.g., the watch crown input interface 340 in FIG. 3), for example, a rotation direction, a rotation speed, and a rotation amount. In addition, the user-associated events may include time information acquired from an electronic or mechanical watch embedded in the wearable electronic device 301, and motion information acquired by the sensor module 176 of the wearable electronic device 301.

The processor 120 may load at least one of the application programs in the volatile memory 132 while the user interface of the application program is not displayed on the touch screen display 160. The application programs may mean the application programs included in the wearable electronic device 301. For example, the application programs may be stored in the nonvolatile memory 134. In addition, loading an application program in the volatile memory 132 without displaying a user interface on the touch screen display 160 may mean the state in which the application program is pre-executed before the user selects and executes the application program. In addition, loading an application program in the volatile memory 132 may mean a background state, which is executed in the state in which the user is not recognized. When the wearable electronic device 301 receives a request for execution of an application program loaded in the volatile memory 132 from a user, the wearable electronic device 301 may quickly execute the application program. When a user input for selecting at least one application program using the touch screen display 160 or the input interface 150 is received, the processor 120 may quickly display the user interface of the application program loaded in the volatile memory 132.

The processor 120 may detect a user-associated event associated with the execution of an application program using components (e.g., the input interface 150, the touch screen display 160, the sensor module 176, and the communication interface 190) included in the wearable electronic device 301, and may update and store the association information stored in the nonvolatile memory 134 based on the detected user-associated event. The processor 120 may apply a learning algorithm to the detected user-associated event so as to update the association information between the user-associated event and at least one of the application programs based on the learning result. The association information may be updated differently for each user.

The processor 120 may detect a user-associated event associated with the execution of an application program using components (e.g., the input interface 150, the touch screen display 160, the sensor module 176, and the communication interface 190) included in the wearable electronic device 301, and may update and store the association information stored in the nonvolatile memory 134 based on the application program executed by the detected user-associated event. The processor 120 may apply a learning algorithm to the application program executed by the detected user-associated event, and may update the association information between the user-associated event and at least one of the application programs based on the learning result. The association information may be updated differently for each user.

The processor 120 may determine the state (e.g., installation, deletion, or update) of a plurality of application programs stored in the nonvolatile memory 134, and may update the association information based on the determined state.

The processor 120 may determine at least one application program to be loaded in the volatile memory 132 while the user interface of the application program is not displayed on the touch screen display 160, based on the association information stored or updated and stored in the nonvolatile memory 134. The processor 120 may determine a usage pattern of the user's personalized application program from the association information, and determine at least one application program to be loaded in the volatile memory 132 according to the determined usage pattern.

The processor 120 may perform communication with an external device (e.g., the server 108 or an electronic device 102 or 104) using the communication interface 190. For example, the communication interface 190 included in the wearable electronic device 301 may support a local area network with an external electronic device located within a predetermined distance (e.g., Bluetooth (BT) or a Wi-Fi network). The processor 120 may be connected to a first external electronic device (e.g., a mobile terminal) using a first network (e.g., a local area network), and may perform information exchange (capability information) for synchronization with the connected first external electronic device. In addition, the processor 120 may download an application program from a second external electronic device (e.g., a web server or a cloud server) using a second network (e.g., a wide area network) via the communication interface 190, or may receive data including association information between the user-associated event and at least one of the application programs.

The processor 120 may perform synchronization with the first external electronic device using a first network supported by the communication interface 190, and while the synchronization with the first external electronic device is being performed, the processor 120 may receive data associated with at least one application program loaded in the volatile memory 132 from the second external electronic device using the second network via the first external electronic device and may store the data.

The processor 120 may execute one or more application programs among the plurality of application programs stored in the nonvolatile memory 134. When the plurality of application programs are executed, the processor 120 may determine situations (e.g., a low memory situation, a temperature rise situation, and a low battery situation) associated with the wearable electronic device. When the determined situations satisfy a designated condition (e.g., a shortage of available capacity of the memory), the processor 120 may determine whether to terminate at least one executed application program based on the association information stored or updated and stored in the nonvolatile memory 134. For example, the processor 120 may determine the priority order of the at least one executed application program based on the association information, and when the determined situation satisfies a designated condition, the processor 120 may prevent termination of the at least one executed application program based on the priority order. The priority order may mean information about an order of an application program to be executed first depending on the execution frequency of the application program. For example, it is possible to prevent the application program having a higher priority order from being terminated by imparting a weight according to the priority order to the application program to be terminated.

Figure 5:
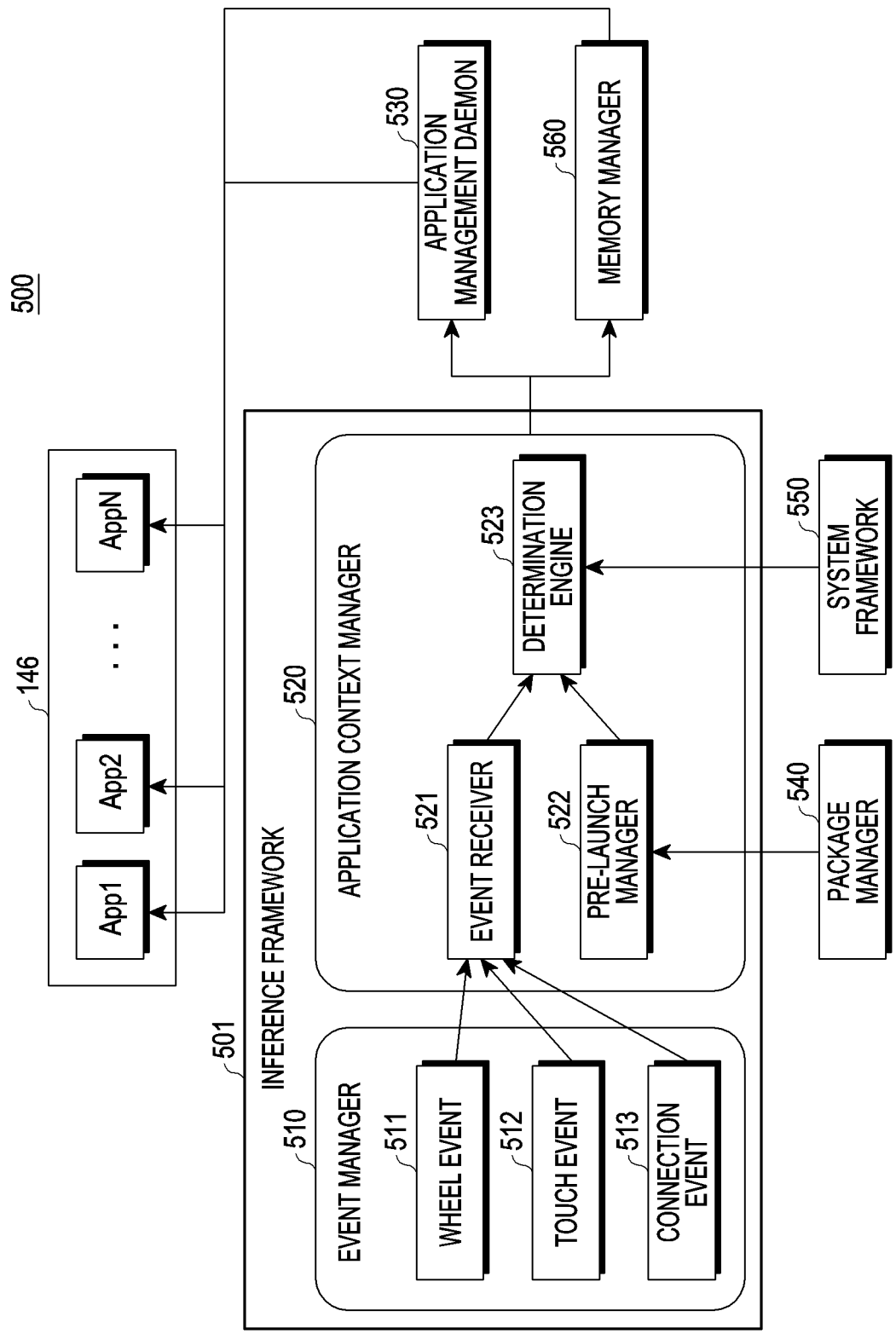
FIG. 5 is a block diagram of an inference framework for controlling an application program by a wearable electronic device according to various embodiments.

FIG. 5 is a block diagram 500 of an inference framework for controlling an application program by a wearable electronic device according to various embodiments.

Referring to FIG. 5, the wearable electronic device 301 (e.g., the electronic device 101) may include an inference framework 501 for controlling the application programs 146. The inference framework 501 may be implemented as a software program stored in the nonvolatile memory 134 of the wearable electronic device 301. The inference framework 501 may perform a function of controlling the application programs 146 directly by the processor 120 or using other components under the control of the processor 120.

The inference framework 501 may include an event manager 510 and an application program context manager 520. In addition, the inference framework 501 may be functionally connected with an application program management daemon 530 configured to execute or terminate an application program, a package manager 540 configured to manage installation, deletion or update of an application program distributed in the form of a package file, a system framework 550 (e.g., the operating system 142) configured to control system resources (e.g., a process, memory, or power), and a memory manager 560 configured to manage memory so as to perform communication of instructions or data associated with the operation of controlling the application programs 146.

The event manager 510 of the inference framework 501 may detect a wheel event 511 including a rotation input by the wheel input interface 330 or the watch crown input interface 340 (e.g., a rotation direction, a rotation speed, or a rotation amount) included in the input interface 150, a touch event 512 including a touch input on the touch screen display 160 (e.g., tap, double-tap, drag, slide, hold/press, swipe, rotation, press and drag, pinch, spread, or the like), and a connection event 513 regarding a communication connection with an external electronic device (e.g., the server 108 or the electronic device 102 or 104) using the communication interface 190, and may provide the detected wheel event 511, touch event 512, and connection event 513 to the application program context manager 520.

The application program context manager 520 of the inference framework 501 may include an event receiver 521 configured to receive the wheel event 511, the touch event 512, and the connection event 513 detected from the event manager 510, a determination engine 523 configured to determine an application program 146 to be pre-executed based on the wheel event 511, the touch event 512, and the connection event 513 received from the event receiver 521, and a pre-launch manager 522 configured to pre-execute the application program 146 to be pre-executed determined by the determination engine 523. The determination engine 523 may receive data including association information (e.g., inference learning data) between a user-associated event and at least one application program from an external electronic device (e.g., a server or a mobile terminal), and may use the received data as initial data to be applied to the learning algorithm. The determination engine 523 may apply the learning algorithm to the wheel event 511, the touch event 512, and the connection event 513 received from the event receiver 521, and may update association information between a user-associated event and at least one of the application programs based on the learning result. The determination engine 523 may determine the application program 146 to be pre-executed based on the updated and stored association information. In addition, the pre-launch manager 522 may transmit a request for pre-execution of the at least one application program 146 determined by the determination engine 523 to the application program management daemon 530. The application program management daemon 530 may load the user interface of the application program 146 requested to be pre-executed in the volatile memory 132 without displaying the user interface of the application program 146 on the touch screen display 160.

Figure 6:
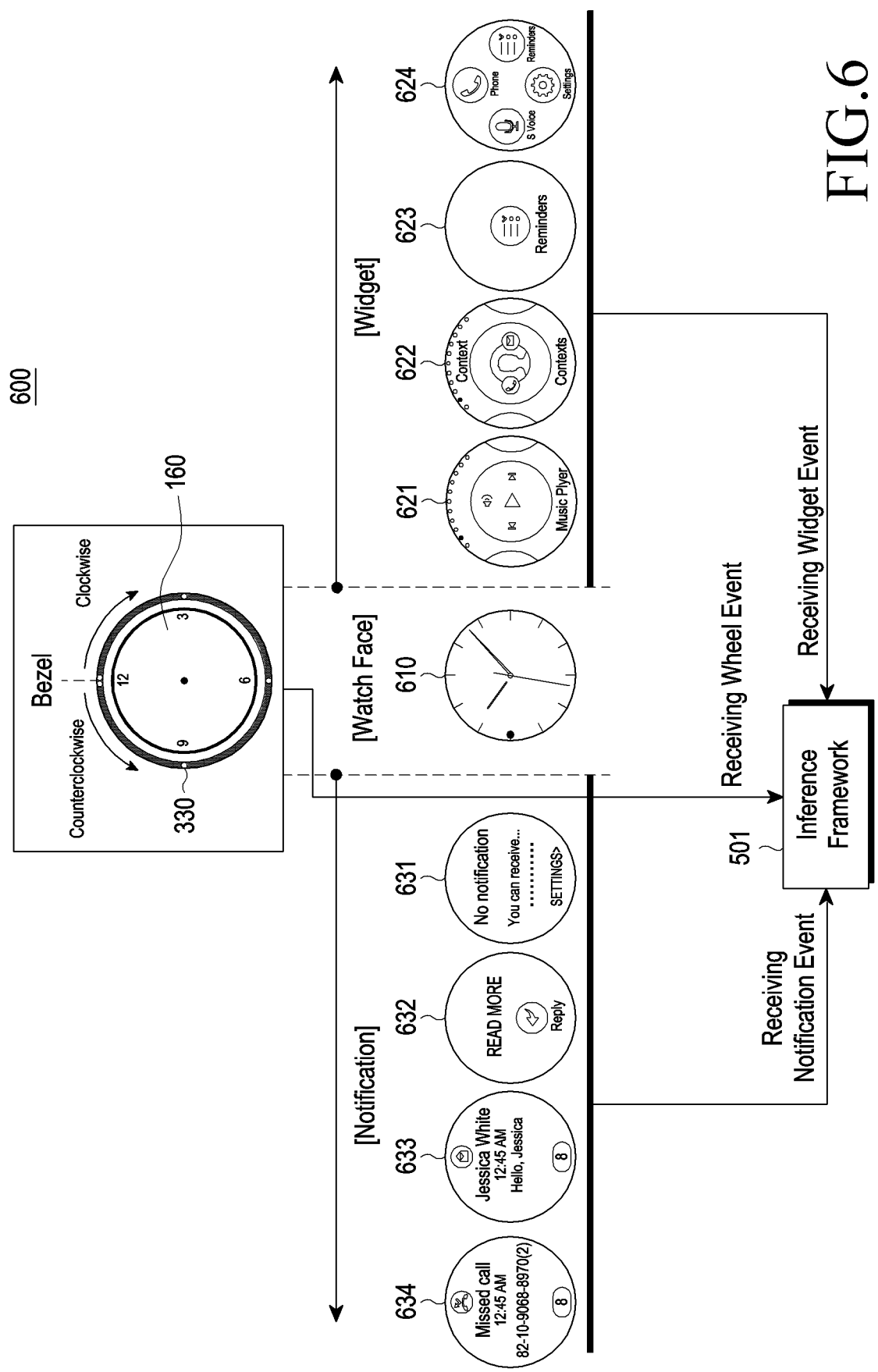
FIG. 6 is a view illustrating an operation of detecting a user-associated event by an inference framework of a wearable electronic device according to various embodiments.

FIG. 6 is a view 600 illustrating an operation of detecting a user-associated event by an inference framework of a wearable electronic device according to various embodiments.

Referring to FIG. 6, the inference framework 501 of the wearable electronic device 301 (e.g., the electronic device 101) may detect a use-associated event associated with the execution of an application program 146 using the wheel input interface 330.

The touch screen display 160 of the wearable electronic device 301 may display a watch face screen 610.

The wearable electronic device 301 may display the screen displayed on the touch screen display 160 as a screen changed depending on the user-associated event of the rotation input performed by the wheel input interface 330. For example, when the wheel input interface 330 is rotated in the clockwise direction, the wearable electronic device 301 may change the watch face screen 610 into a widget screen 621, 622, 623, or 624 associated with the application program depending on the rotation speed or the rotation amount of the wheel input interface 330, and may display the widget screen 621, 622, 623, or 624. As another example, when the wheel input interface 330 is rotated in the counterclockwise direction, the wearable electronic device 301 may change the watch face screen 610 into a widget screen 631, 632, 633, or 634 associated with the notification depending on the rotation speed or the rotation amount of the wheel input interface 330, and may display the widget screen 6312, 632, 633, or 634. The inference framework 501 may receive a wheel event including rotation input information generated by the wheel input interface 330. In addition, the inference framework 501 may receive a widget event including information about the widget screen 621, 622, 623, or 624 displayed in response to the clockwise rotation of the wheel input interface 330. In addition, the inference framework 501 may receive a notification event including information about a notification screen 631, 632, 633, or 634 displayed in response to the counterclockwise rotation of the wheel input interface 330. The inference framework 501 may update information about the execution frequency of an application program executed in response to a user-associated event based on the received wheel event, widget event, and notification event, and may update the association information between the user-associated event and at least one of the application programs based on the updated information. The association information may be updated differently for each user.

Figure 7:
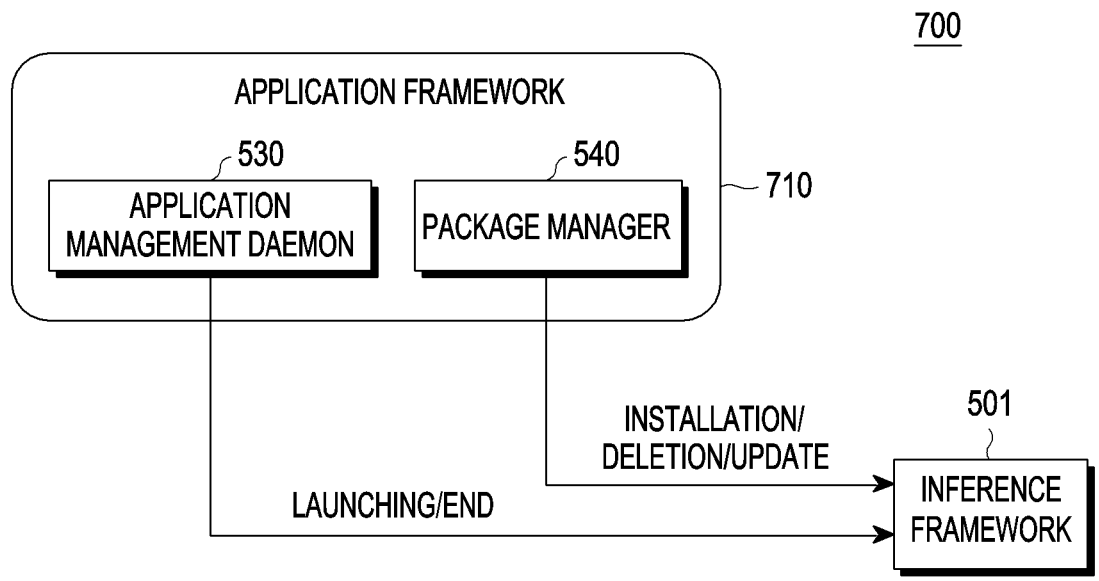
FIG. 7 is a view illustrating an operation of determining the state of an application program by an inference framework of a wearable electronic device according to various embodiments.

FIG. 7 is a view 700 illustrating an operation of determining the state of an application program by an inference framework of a wearable electronic device according to various embodiments.

Referring to FIG. 7, the inference framework 501 of the wearable electronic device 301 (e.g., the electronic device 101) may receive state information of application programs from the application program management daemon 530 and the package manager 540 included in the application program framework 710 configured to manage execution, termination, installation, deletion, or update of an application program. The inference framework 501 may receive information associated to execution (launching) or termination of an application program from the application program management daemon 530. The inference framework 501 may receive information associated with installation, deletion, or update of an application program from the package manager 540. The inference framework 501 may determine the state of a plurality of application programs stored in the nonvolatile memory 134 based on information received from the application program management daemon 530 and the package manager 540, and may update association information between a user-associated event and at least one of the application programs based on the determined state. The association information may be updated differently for each user.

Figure 8:
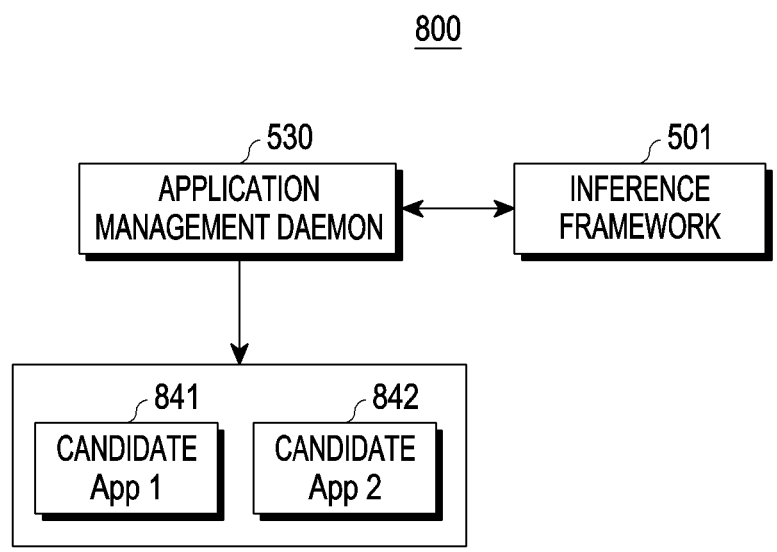
FIG. 8 is a view illustrating an operation of pre-executing an application program by an inference framework of a wearable electronic device according to various embodiments.

FIG. 8 is a view 800 illustrating an operation of pre-executing an application program by an inference framework of a wearable electronic device according to various embodiments.

Referring to FIG. 8, the inference framework 501 of the wearable electronic device 301 (e.g., the electronic device 101) may receive association information (e.g., inference learning data) between a use-associated event and at least one of the application programs from an external electronic device (e.g., a server or a mobile terminal) and store the received association information in the nonvolatile memory 134, may detect a user-associated event associated with the execution of the application program using components (e.g., the input interface 150, the touch screen display 160, the sensor module 176, and the communication interface 190) included in the wearable electronic device 301, and may update and store the association information stored in the application program stored in the nonvolatile memory 134 based on the detected user-associated event or an application program executed by the detected user-associated event. In addition, the inference framework 501 may determine the state (e.g., installation, deletion, or update) of a plurality of application programs stored in the nonvolatile memory 134, and may update and store the association information based on the determined state. In addition, the inference framework 501 may determine at least one application program 841 or 842 to be loaded in the volatile memory 132 while the user interface of the application program is not displayed on the touch screen display 160, based on the association information stored or updated and stored in the nonvolatile memory 134.

The inference framework 501 may be functionally connected to the application program management daemon 530 and may request to pre-execute the at least one determined application program 841 or 842. The application program management daemon 530 may load the at least one application program 841 or 842 requested to be pre-executed in the volatile memory 132 without displaying the user interface thereof on the touch screen display 160. In addition, loading an application program in the volatile memory 132 may mean the state in which the application program is pre-executed before the user selects and executes the application program. In addition, loading an application program in the volatile memory 132 may mean a background state, which is executed in the state in which the user is not recognized. When the wearable electronic device 301 receives a request for execution of the application programs 841 and 842 from the user, the wearable electronic device 301 may quickly execute or provide an application program loaded in the volatile memory 132.

Figure 9:
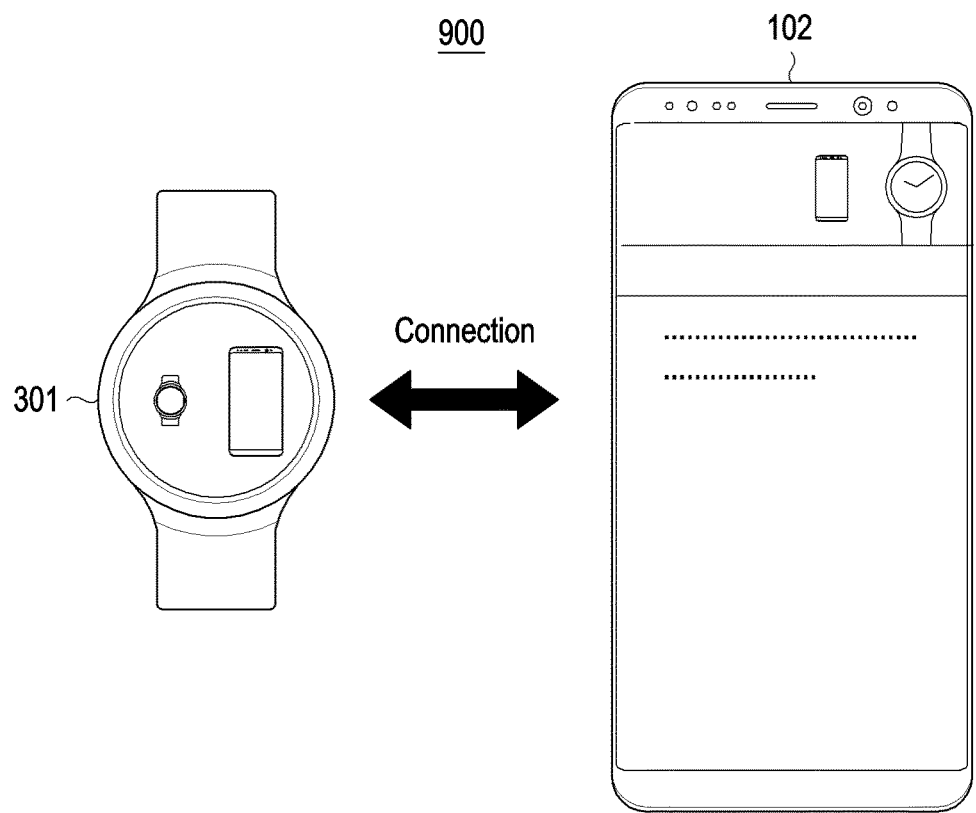
FIG. 9 is a conceptual view illustrating a connection between a wearable electronic device and an external electronic device according to various embodiments.

FIG. 9 is a conceptual view 900 illustrating a connection between a wearable electronic device and an external electronic device according to various embodiments.

Referring to FIG. 9, a wearable electronic device 301 (e.g., the electronic device 101) may form a local communication connection 198 (e.g., Bluetooth (BT) or Wi-Fi) with a first external electronic device 102. The wearable electronic device 301 may perform information exchange (capability exchange) for synchronization with the first external electronic device 102 through the formed communication connection. In addition, the wearable electronic device 301 may download an application program from a second external electronic device 108 (e.g., a web server or a cloud server) using the first external device 120 and a web proxy function through the formed communication connection using a second network 199 (e.g., a wide area network) via the first external electronic device 102, or may receive data including association information between the user-associated event and at least one of the application programs.

According to an embodiment, while performing the synchronization with the first external electronic device 102, the wearable electronic device 301 may receive data associated with at least one application program loaded in the volatile memory 132 from the second external electronic device 108 using the second network 199 via the first external electronic device 102 and may store the data.

Figure 10:
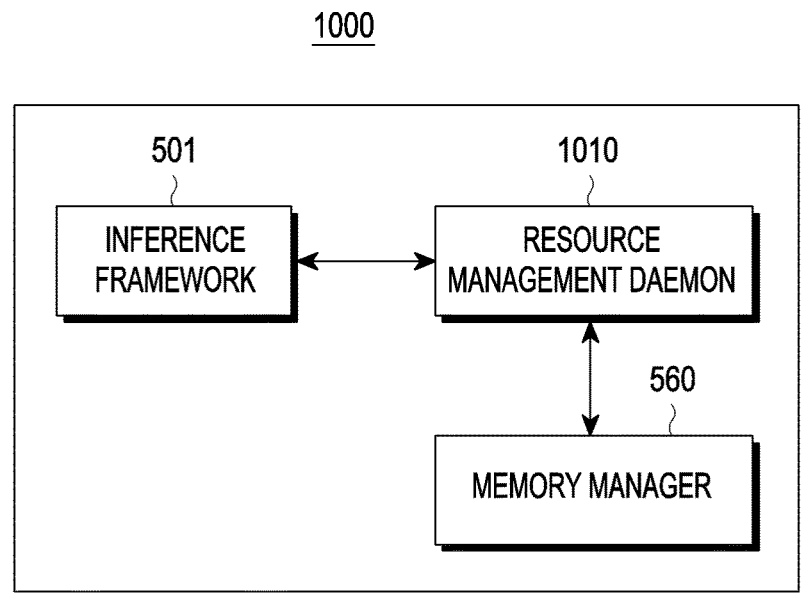
FIG. 10 is a view illustrating an operation of managing memory by an inference framework of a wearable electronic device according to various embodiments.

FIG. 10 is a view 1000 illustrating an operation of managing memory by an inference framework of a wearable electronic device according to various embodiments.

Referring to FIG. 1, the wearable electronic device 301 (e.g., the electronic device 101) may execute one or more of the plurality of application programs stored in the nonvolatile memory 134. When the plurality of application programs are executed, the wearable electronic device 301 may determine situations (e.g., a low memory situation, a temperature rise situation, and a low battery situation) associated with the wearable electronic device. When the determined situations satisfy a designated condition (e.g., a shortage of available capacity of the memory), the wearable electronic device 301 may determine whether at least one of the executed one or more executed application programs is terminated based on the association information stored or updated and stored in the nonvolatile memory 134.

For example, the inference framework 501 of the wearable electronic device 301 may determine the priority order of at least one of executed application programs based on the association information stored or updated and stored in the nonvolatile memory 134, and when the determined situation satisfies a designated condition, the processor 120 may prevent or control termination of the at least one executed application program based on the priority order.

The inference framework 501 may be functionally connected with the resource management daemon 1010 and the memory manager 560 so as to deal with situations associated with the wearable electronic device 301 (e.g., low memory situation, temperature rise situation, and low battery situation). When the determined situations satisfy a designated condition (e.g., a shortage of available capacity of the memory), the inference framework 501 may determine the priority order of the at least one executed application program based on the association information stored or updated and stored in the nonvolatile memory 134, and may provide the determined priority order of the application program to the memory manager 560 via the resource management daemon 1010. For example, the memory manager 560 may prevent the application program having a higher priority order from being terminated by imparting a weight according to the priority order to the at least one application program to be terminated.

According to various embodiments, an electronic device (e.g., the wearable electronic 301 or the electronic device 101) may include: a housing 310; a mounting structure 350 connected to the housing 310 and configured to be detachably mounted on a portion of a user's body, a touch screen display (e.g., the display device 160 or the touch screen 320) exposed through a portion of the housing 310, an input interface (e.g., the input interface 150, the wheel input interface 330, or the watch crown input interface 340) located on or attached to the housing, a processor 120 operatively connected to the touch screen display 160 and the input interface 150, volatile memory 132 operatively connected to the processor 120, and nonvolatile memory 134 operatively connected to the processor 120. The nonvolatile memory 134 may be configured to store a plurality of application programs 146, and to store instructions that, when executed, cause the processor 120 to: receive data including association information between a user-associated event and at least one application program among the application programs from an external electronic device (e.g., the electronic device 102, the electronic device 104, or the server 108) and store the data in the nonvolatile memory 134, detect the user-associated event, and load the at least one application program in the volatile memory 132 while a user interface of the application program is not being displayed on the touch screen display 160.

In the electronic device 301 according to various embodiments, the user-associated event may be associated with the touch screen display 160 or the input interface 150.

In the electronic device 301 according to various embodiments, the input interface 150 may include at least one of a wheel input interface 330 or a watch crown input interface 340.

In the electronic device 301 according to various embodiments, the user-associated event may be associated with a selected time of a day or a motion detected by the electronic device.

In the electronic device 301 according to various embodiments, the instructions may be configured to cause the processor 120 to receive a user input for selecting the at least one application program 146 using the touch screen display 160 or the input interface 150, and display the user interface on the touch screen display 160 when the user input is received.

The electronic device 301 according to various embodiments, the instructions may be configured to cause the processor to detect the user-associated event, and update the association information based on the detected user-associated event.

The electronic device 301 according to various embodiments, the instructions may be configured to cause the processor 120 to: detect the user-associated event; and update the association information based on an application program 146 executed by the detected user-associated event.

The electronic device 301 according to various embodiments, the instructions are configured to cause the processor 120 to: determine a state of the plurality of application programs stored in the nonvolatile memory 134; and update the association information based on the determined state.

The electronic device 301 according to various embodiments, the instructions may be configured to cause the processor 120 to determine at least one application program 146 to be loaded in the volatile memory 132 while the user interface of the application program 146 is not being displayed on the touch screen display 160, based on the association information.

In the electronic device 301 according to various embodiments, the electronic device 301 may further include a communication interface 190 configured to perform data communication using a first external electronic device (e.g., the electronic device 102, the electronic device 104, or the server 108) and a first network 198. The instructions may be configured to cause the processor 120 to: perform synchronization with the first external electronic device 102 using the first network 198, and receive data associated with the at least one application program 146 loaded in the volatile memory 132 from the second external electronic device (e.g., the electronic device 104 or the server 108) using the second network 199 via the first external electronic device 102 while the synchronization with the first external electronic device 102 is being performed.

In the electronic device 301 according to various embodiments, the first network 198 may include at least one of BT or a Wi-Fi network, and the second network 199 may include at least one of 3G or an LTE network.

In the electronic device 301 according to various embodiments, the instructions may be configured to cause the processor 120 to execute at least one application program 146, determine a situation associated with the electronic device, and determine whether to terminate the at least one executed application program 146 based on the association information when the determined situation satisfies a designated condition.

In the electronic device 301 according to various embodiments, the instructions may be configured to cause the processor 120 to determine a priority order of the at least one executed application program 146 based on the association information, and prevent termination of the at least one executed application program based on the priority order when the determined situation satisfies the designated condition.

Figure 11:
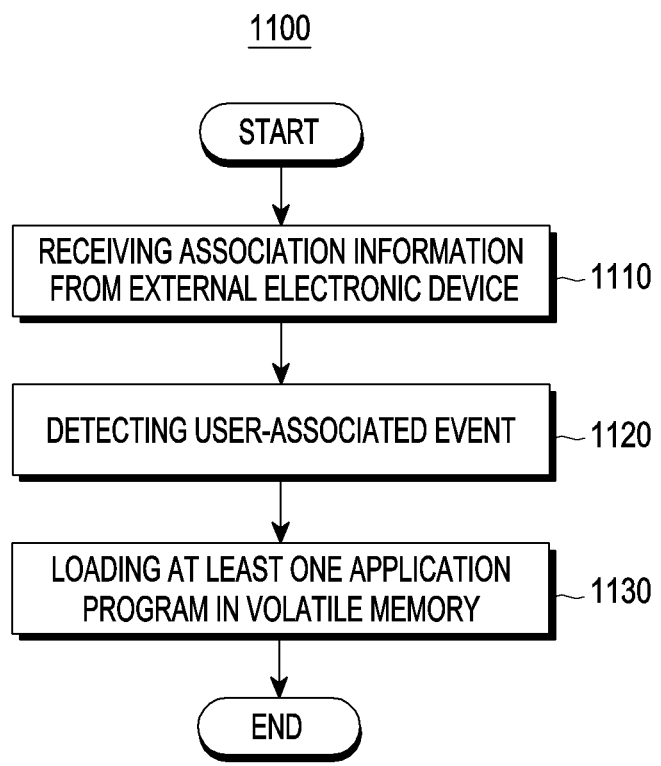
FIG. 11 is a flowchart illustrating a method of controlling an application program by a wearable electronic device according to various embodiments.

FIG. 11 is a flowchart 1100 illustrating a method of controlling an application program by a wearable electronic device according to various embodiments.

According to various embodiments, operations 1110 to 1130 may be executed by the wearable electronic device 301 or the processor 120. The wearable electronic device 301 may store instructions that cause operations 1110 to 1130 to be executed and the inference framework 501 in the nonvolatile memory 134 of the memory 130.

In operation 1110, the wearable electronic device 301 (e.g., the processor 120) may receive data including association information (e.g., inference learning data) between a user-associated event and at least one of the application programs from an external electronic device (e.g., a server or a mobile terminal) by controlling the communication interface 190. The wearable electronic device 301 may store the received data in the nonvolatile memory 134 of the memory 130. The association information included in the data may be information about an association between an application program and user-associated events collected from various users from external electronic devices (e.g., a web server and a cloud server). For example, an external electronic device may collect information about the frequency of execution of an application program, information about the number of times of execution of the application program for a predetermined period (e.g., one week), information about user-related events associated with the execution of the application program, and the like from various users, and may generate the association information. The association information generated by the external electronic device is based on statistics of general user patterns, and may be different from the user pattern of each individual user. The association information may be information about a user-associated event associated with the execution of the application program, and the user-associated events may be associated with the touch screen display 160 or the input interface 150. According to an embodiment, the association information may include the execution frequency of an application program executed in response to a user-associated event associated with a user input directly input by the user via the touch screen display 160 or the input interface 150. For example, the association information may include an association with an application program executed in response to a user-associated event including rotation input information input according to the rotation of the input interface 150. As another example, the association information may include an association with an application program executed in response to a user-associated event including touch input information input according to the touch of the touch screen 160. According to an embodiment, the association information may include the execution frequency of an application program executed in response to a user-associated event associated with information collected by the wearable electronic device 301. For example, the association information may include an association with an application program executed in response to a user-associated event including the time selected in association with one day (e.g., morning, noon, and evening), the time selected for the day of the week (e.g., Monday, Tuesday, Wednesday, . . . , Holiday), and the time selected in association with the year (e.g., 2017, 2018, and event-scheduled year).

According to an embodiment, the association information may include an association with an application program executed in response to a user-associated event including motion information detected by the wearable electronic device 301. For example, the association information may include an association with an application program executed in response to a user-associated event including an exercise motion of the user (e.g., running or walking), a resting motion of the user (e.g., sitting, standing, or sleeping), and a motion for riding in a vehicle. According to an embodiment, the association information may include an association with an application program executed in response to a user-associated event associated with the information about the state of the wearable electronic device 301. For example, the association information may include an association with an application program executed in response to a user-associated event including the occurrence of an acknowledgment (e.g., an acknowledgment of receipt of a message, a phone call, or the like) and the occurrence of a notification (e.g., a notification of low battery, low memory, or the like).

In operation 1120, the wearable electronic device 301 may detect a user-associated event associated with the execution of an application program using components (e.g., the input interface 150, the touch screen display 160, the sensor module 176, and the communication interface 190) included in the wearable electronic device 301. User-associated events may include events associated with the touch screen 160 or the input interface 150, and the user-associated events associated with the touch screen display 160 may include touch input events on a touch screen display 160, for example, tap, double-tap, drag, slide, hold/press, swipe, rotation, press and drag, pinch, spread, and the like. In addition, user-associated events associated with the input interface 150 may include rotation input events of a wheel input interface (e.g., the wheel input interface 330 in FIG. 3) or a watch crown input interface (e.g., the watch crown input interface 340 in FIG. 3), for example, a rotation direction, a rotation speed, and a rotation amount. In addition, the user-associated events may include time information acquired from an electronic or mechanical watch embedded in the wearable electronic device 301, and motion information acquired by the sensor module 176 of the wearable electronic device 301.

In operation 1130, the wearable electronic device 301 may load at least one of the application program in the volatile memory 132 while the user interface of the application program is not displayed on the touch screen display 160. The application programs may mean the application programs included in the wearable electronic device 301. For example, the application programs may be stored in the nonvolatile memory 134. In addition, loading an application program in the volatile memory 132 without displaying a user interface on the touch screen display 160 may mean the state in which the application program is pre-executed before the user selects and executes the application program. In addition, loading an application program in the volatile memory 132 may mean a background state, which is executed in the state in which the user is not recognized. When the wearable electronic device 301 according to an embodiment receives a request for execution of an application program loaded in the volatile memory 132 from a user, the wearable electronic device 301 may quickly execute the application program.

Figure 12:
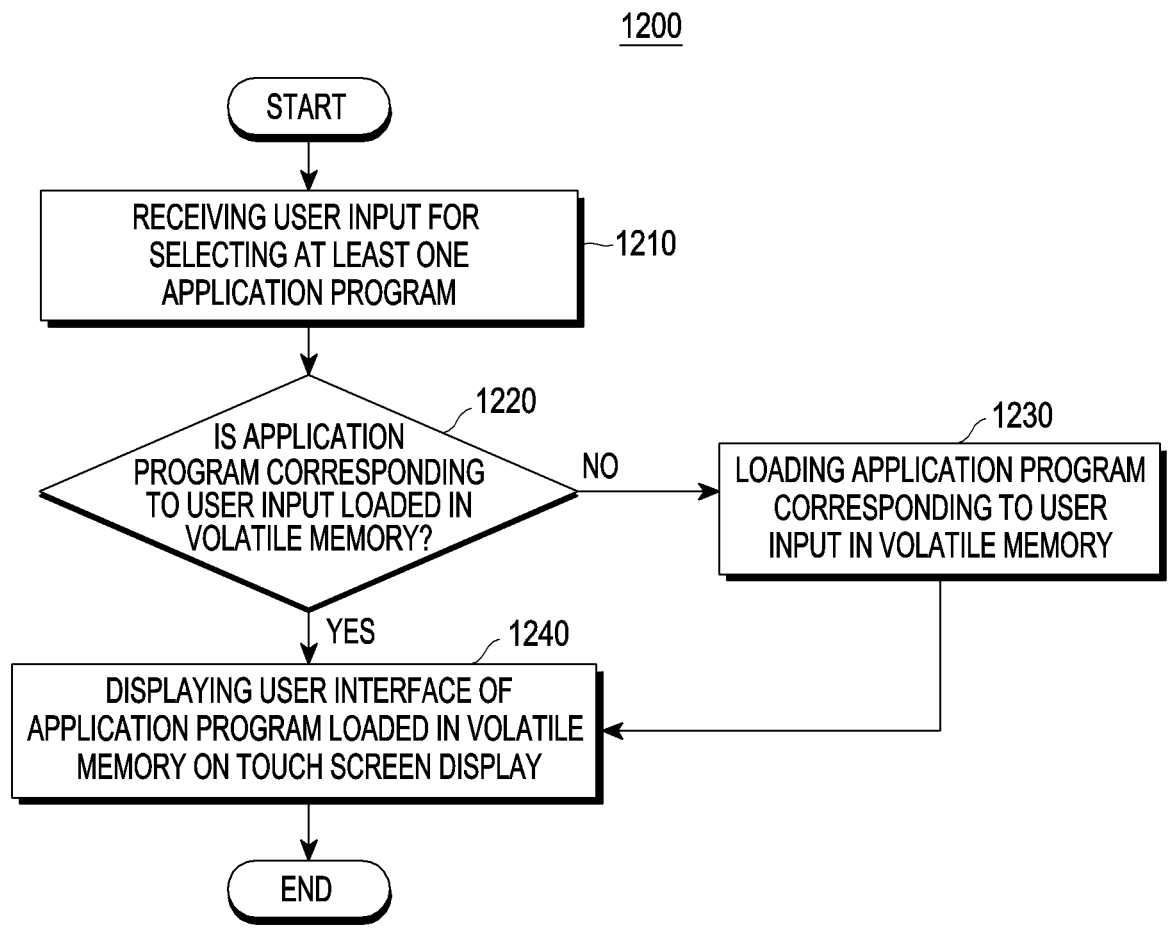
FIG. 12 is a flowchart illustrating a method of controlling an application program by a wearable electronic device according to various embodiments.

FIG. 12 is a flowchart 1200 illustrating a method of controlling an application program by a wearable electronic device according to various embodiments.

According to various embodiments, operations 1210 to 1240 may be executed by the wearable electronic device 301 or the processor 120. The wearable electronic device 301 may store instructions that cause operations 1210 to 1240 to be executed and the inference framework 501 in the nonvolatile memory 134 of the memory 130.

In operation 1210, the wearable electronic device 301 (e.g., the processor 120) may receive a user input for selecting at least one application program using the touch screen display 160 or the input interface 150.

In operation 1220, the wearable electronic device 301 may identify whether an application program corresponding to the user input is an application program loaded in the volatile memory 132. When it is determined that the application program corresponding to the user input is not loaded in the volatile memory 132, in operation 1230, the wearable electronic device 301 may load the application program corresponding to the user input in the volatile memory 132 so as to execute the application program.

In operation 1220, when it is identified that the application program corresponding to the user input is loaded in the volatile memory 132, in operation 1240, the wearable electronic device 301 may immediately display the user interface of the application program loaded in the volatile memory 132 on the touch screen display 160.

Figure 13:
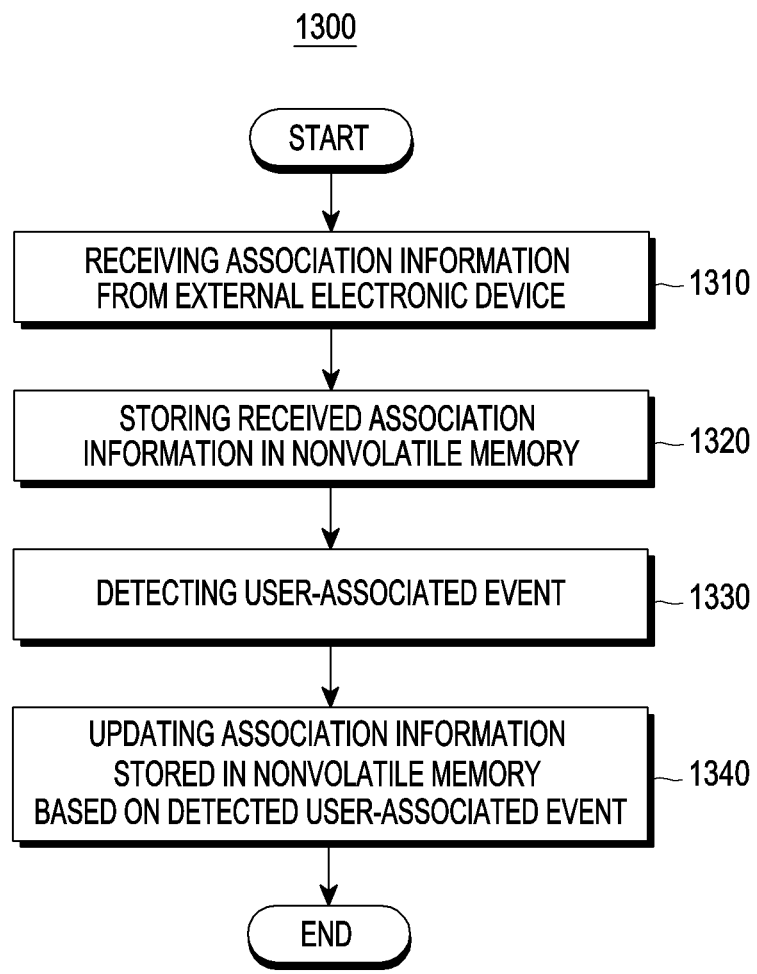
FIG. 13 is a flowchart illustrating a method of controlling an application program by a wearable electronic device according to various embodiments.

FIG. 13 is a flowchart 1300 illustrating a method of controlling an application program by a wearable electronic device according to various embodiments.

According to various embodiments, operations 1310 to 1340 may be executed by the wearable electronic device 301 or the processor 120. The wearable electronic device 301 may store instructions that cause operations 1310 to 1340 to be executed and the inference framework 501 in the nonvolatile memory 134 of the memory 130.

In operation 1310, the wearable electronic device 301 (e.g., the processor 120) may receive data including association information (e.g., inference learning data) between a user-associated event and at least one of the application programs from an external electronic device (e.g., a server or a mobile terminal) by controlling the communication interface 190.

In operation 1320, the wearable electronic device 301 may store association information included in the received data in the nonvolatile memory 134 of the memory 130.

In operation 1330, the wearable electronic device 301 may detect a user-associated event associated with the execution of an application program using components (e.g., the input interface 150, the touch screen display 160, the sensor module 176, and the communication interface 190) included in the wearable electronic device 301.

In operation 1340, the wearable electronic device 301 may update the association information stored in the nonvolatile memory 134 based on the detected user-associated event. The wearable electronic device 301 may store the updated association data in the nonvolatile memory 134 of the memory 130. For example, the wearable electronic device 301 may apply a learning algorithm to the detected user-associated event so as to update the association information between the user-associated event and at least one of the application programs based on the learning result. The association information may be updated differently for each user. According to an embodiment, the wearable electronic device 301 may provide updated association information based on the learning result to an external electronic device (e.g., a server or a cloud server) periodically or at the time of update.

Figure 14:
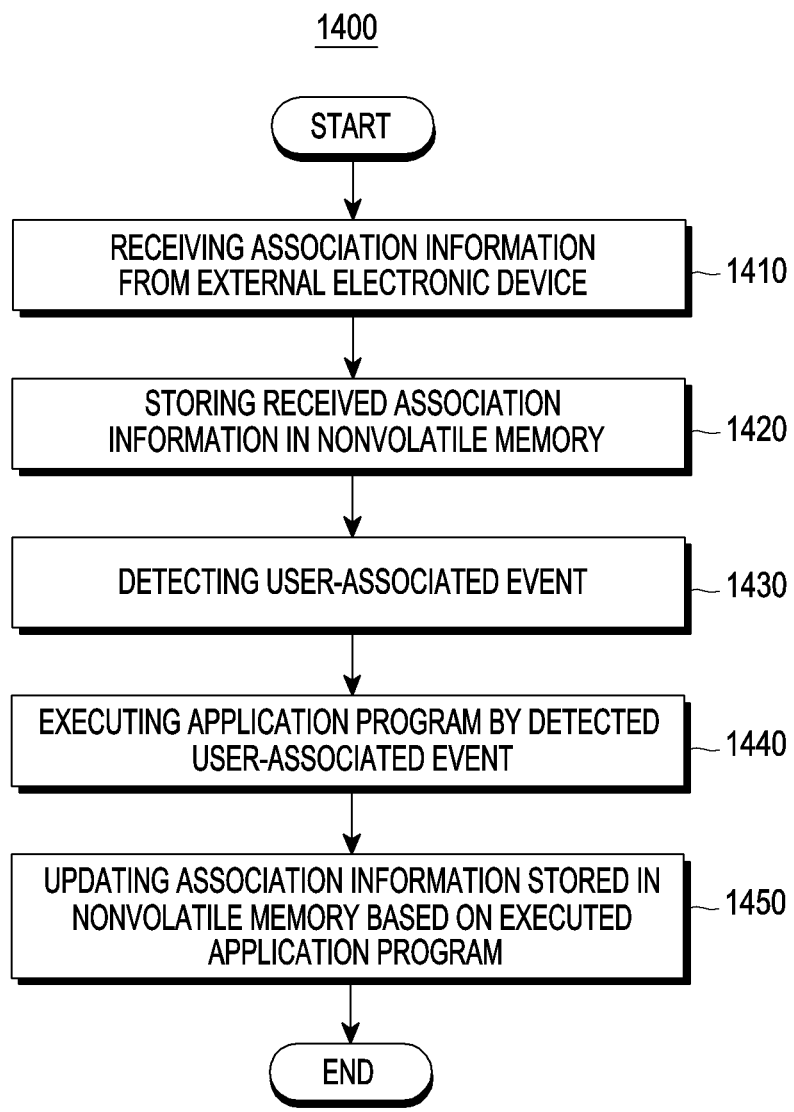
FIG. 14 is a flowchart illustrating a method of controlling an application program by a wearable electronic device according to various embodiments.

FIG. 14 is a flowchart 1400 illustrating a method of controlling an application program by a wearable electronic device according to various embodiments.

According to various embodiments, operations 1410 to 1450 may be executed by the wearable electronic device 301 or the processor 120. The wearable electronic device 301 may store instructions that cause operations 1410 to 1450 to be executed and the inference framework 501 in the nonvolatile memory 134 of the memory 130.

In operation 1410, the wearable electronic device 301 (e.g., the processor 120) may receive data including association information (e.g., inference learning data) between a user-associated event and at least one of the application programs from an external electronic device (e.g., a server or a mobile terminal) by controlling the communication interface 190.

In operation 1420, the wearable electronic device 301 may store association information included in the received data in the nonvolatile memory 134 of the memory 130.

In operation 1430, the wearable electronic device 301 may detect a user-associated event associated with the execution of an application program using components (e.g., the input interface 150, the touch screen display 160, the sensor module 176, and the communication interface 190) included in the wearable electronic device 301.

In operation 1440, the wearable electronic device 301 may execute an application program by the detected user-associated event. The wearable electronic device 301 may identify an application program executed in response to a user-associated event including rotation input information input according to the rotation of the input interface 150 or touch input information input according the touch of the touch screen display 160. Alternatively, the wearable electronic device 301 may identify an application program executed in response to a user-associated event including a selected time. Alternatively, the wearable electronic device 301 may identify an application program executed in response to a user-associated event including motion information detected the wearable electronic device 301. Alternatively, the wearable electronic device 301 may identify an application program executed in response to a user-associated event (e.g., occurrence of an acknowledgment or a notification) associated with state information of the wearable electronic device 301.

In operation 1450, the wearable electronic device 301 may update the association information stored in the nonvolatile memory 134 based on the application program executed by the detected user-associated event. For example, the wearable electronic device 301 may identify the application program executed by the detected user-associated event, and when the association information between the detected user-associated event and the executed application program is different from previously stored association information, the wearable electronic device 301 may update the previously updated association information to the newly identified association information. The wearable electronic device 301 may store the updated association data in the nonvolatile memory 134 of the memory 130. For example, the wearable electronic device 301 may apply a learning algorithm to the application program executed by the detected user-associated event so as to update the association information between the user-associated event and at least one of the application programs based on the learning result. The association information may be updated differently for each user. In addition, the wearable electronic device 301 may provide updated association information based on the learning result to an external electronic device (e.g., a server or a cloud server) periodically or at the time of update.

Figure 15:
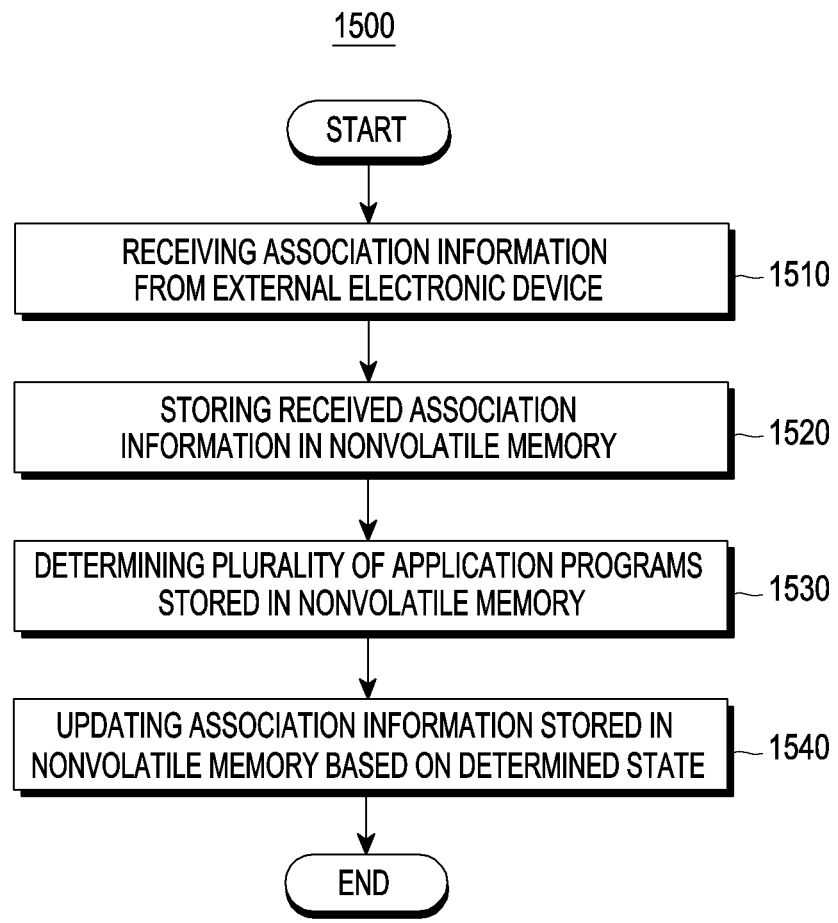
FIG. 15 is a flowchart illustrating a method of controlling an application program by a wearable electronic device according to various embodiments.

FIG. 15 is a flowchart 1500 illustrating a method of controlling an application program by a wearable electronic device according to various embodiments.

According to various embodiments, operations 1510 to 1540 may be executed by the wearable electronic device 301 or the processor 120. The wearable electronic device 301 may store instructions that cause operations 1510 to 1540 to be executed and the inference framework 501 in the nonvolatile memory 134 of the memory 130.

In operation 1510, the wearable electronic device 301 (e.g., the processor 120) may receive data including association information (e.g., inference learning data) between a user-associated event and at least one of the application programs from an external electronic device (e.g., a server or a mobile terminal) by controlling the communication interface 190.

In operation 1520, the wearable electronic device 301 may store association information included in the received data in the nonvolatile memory 134 of the memory 130.

In operation 1530, the wearable electronic device 301 may determine the state (e.g., installation, deletion, and update) of the plurality of application programs stored in the nonvolatile memory 134. For example, the inference framework 501 may receive information associated with execution (launch) or termination of an application program via the application program management daemon 530, and may receive information associated with the installation, deletion, or update of the application program through the package manager 540. The wearable electronic device 301 may determine the state of the plurality of application programs stored in the nonvolatile memory 134 based on the identified information.

In operation 1540, the wearable electronic device 301 may update the association information a user-associated event and at least one application program of an application program based on the determined state. The wearable electronic device 301 may store the updated association data in the nonvolatile memory 134 of the memory 130. The association information may be updated differently for each user.

Figure 16:
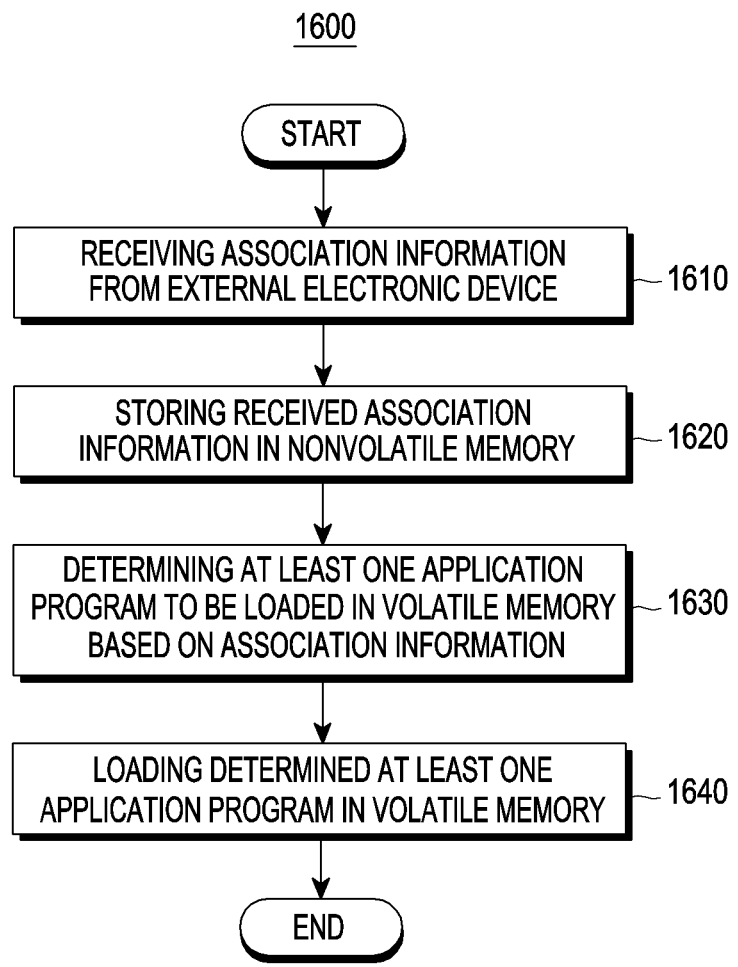
FIG. 16 is a flowchart illustrating a method of controlling an application program by a wearable electronic device according to various embodiments.

FIG. 16 is a flowchart 1600 illustrating a method of controlling an application program by a wearable electronic device according to various embodiments.

According to various embodiments, operations 1610 to 1640 may be executed by the wearable electronic device 301 or the processor 120. The wearable electronic device 301 may store instructions that cause operations 1610 to 1640 to be executed and the inference framework 501 in the nonvolatile memory 134 of the memory 130.

In operation 1610, the wearable electronic device 301 (e.g., the processor 120) may receive data including association information (e.g., inference learning data) between a user-associated event and at least one of the application programs from an external electronic device (e.g., a server or a mobile terminal) by controlling the communication interface 190.

In operation 1620, the wearable electronic device 301 may store association information included in the received data in the nonvolatile memory 134 of the memory 130.

In operation 1630, the wearable electronic device 301 may determine at least one application program to be loaded in the volatile memory 132 while the user interface of the application program is not displayed on the touch screen display 160, based on the association information stored or updated and stored in the nonvolatile memory 134. For example, the wearable electronic device 301 may determine a usage pattern of the user's personalized application program from the association information, and determine at least one application program to be loaded in the volatile memory 132 according to the determined usage pattern.

In operation 1640, the wearable electronic device 301 may load the at least one determined application program in the volatile memory 132.

Figure 17:
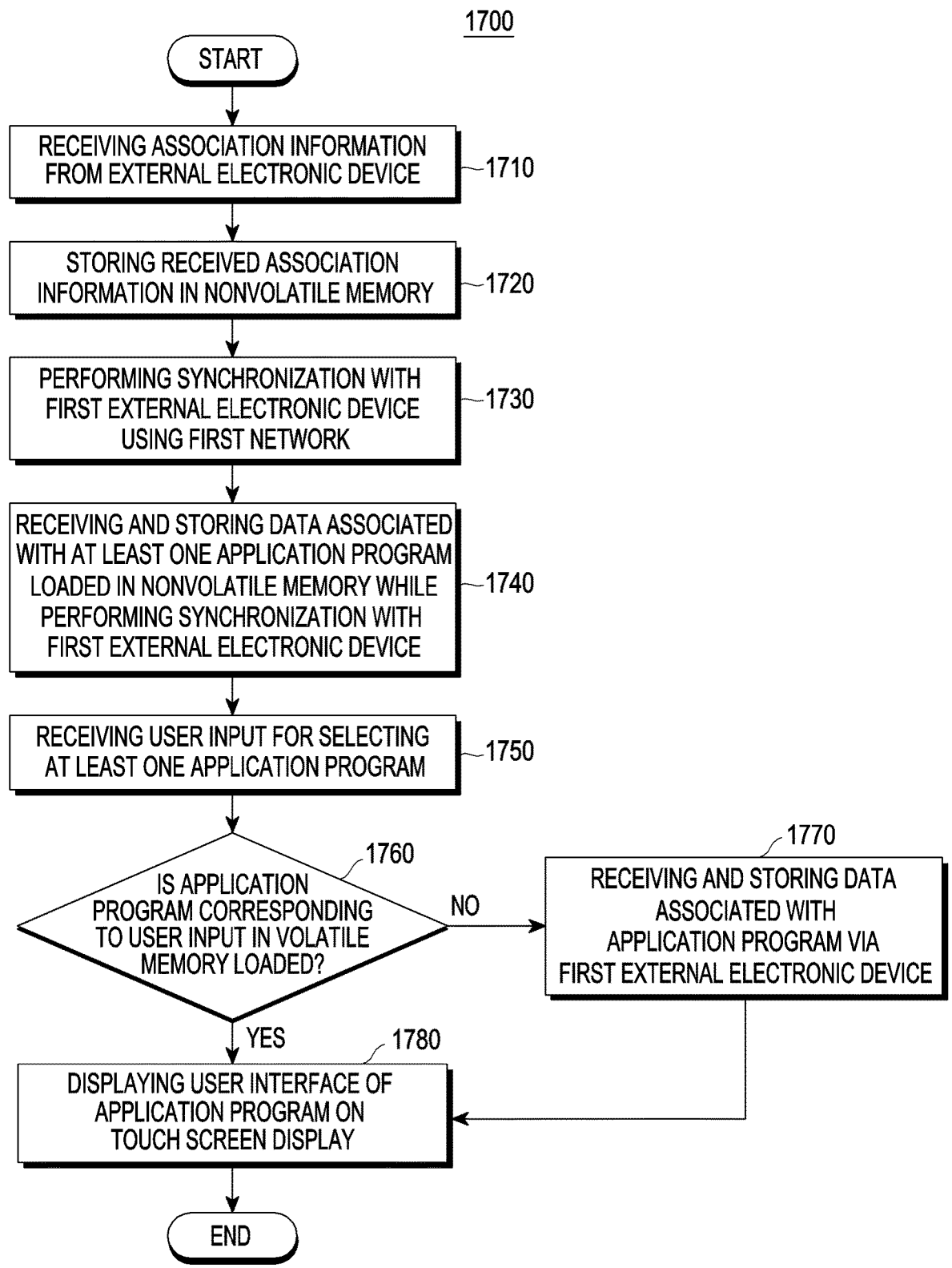
FIG. 17 is a flowchart illustrating a method of controlling an application program by a wearable electronic device according to various embodiments.

FIG. 17 is a flowchart illustrating a method of controlling an application program by a wearable electronic device according to various embodiments.

According to various embodiments, operations 1710 to 1780 may be executed by the wearable electronic device 301 or the processor 120. The wearable electronic device 301 may store instructions that cause operations 1710 to 1780 to be executed and the inference framework 501 in the nonvolatile memory 134 of the memory 130.

In operation 1710, the wearable electronic device 301 (e.g., the processor 120) may receive data including association information (e.g., inference learning data) between a user-associated event and at least one of the application programs from an external electronic device (e.g., a server or a mobile terminal) by controlling the communication interface 190.

In operation 1720, the wearable electronic device 301 may store association information included in the received data in the nonvolatile memory 134 of the memory 130.

In operation 1730, the wearable electronic device 301 may establish a communication connection with a first external electronic device (e.g., a mobile terminal) via a first network (e.g., a local area network) using the communication interface 190. The wearable electronic device 301 may perform synchronization with the first external electronic device using the first network. The wearable electronic device 301 may perform information exchange (capability exchange) for synchronization with the first external electronic device.

In operation 1740, while performing the synchronization with the first external electronic device 102, the wearable electronic device 301 may receive data associated with at least one application program loaded in the volatile memory 132 from the second external electronic device using the second network (e.g., the wide area network) via the first external electronic device 102 and may store the data. Data associated with the application programs may include information provided by the application programs. For example, when the application programs provide weather information, the associated data may include weather information provided from the second external electronic device (e.g., a weather information providing server). Alternatively, the data associated with the application programs may include information for updating the application programs.

In operation 1750, the wearable electronic device 301 may receive a user input for selecting at least one application program using the touch screen display 160 or the input interface 150.

In operation 1760, the wearable electronic device 301 may identify whether an application program corresponding to the user input is an application program loaded in the volatile memory 132. When it is determined that the application program corresponding to the user input is not loaded in the volatile memory 132, in operation 1770, the wearable electronic device 301 may receive data associated with the application program from the second external electronic device using the second network (e.g., wide area network) via the first external device 102 and may store the data.

In operation 1760, when it is determined that the application program corresponding to the user input is loaded in the volatile memory 132, in operation 1780, the wearable electronic device 301 may immediately display the user interface of the application program loaded in the volatile memory 132 on the touch screen display 160.

Figure 18:
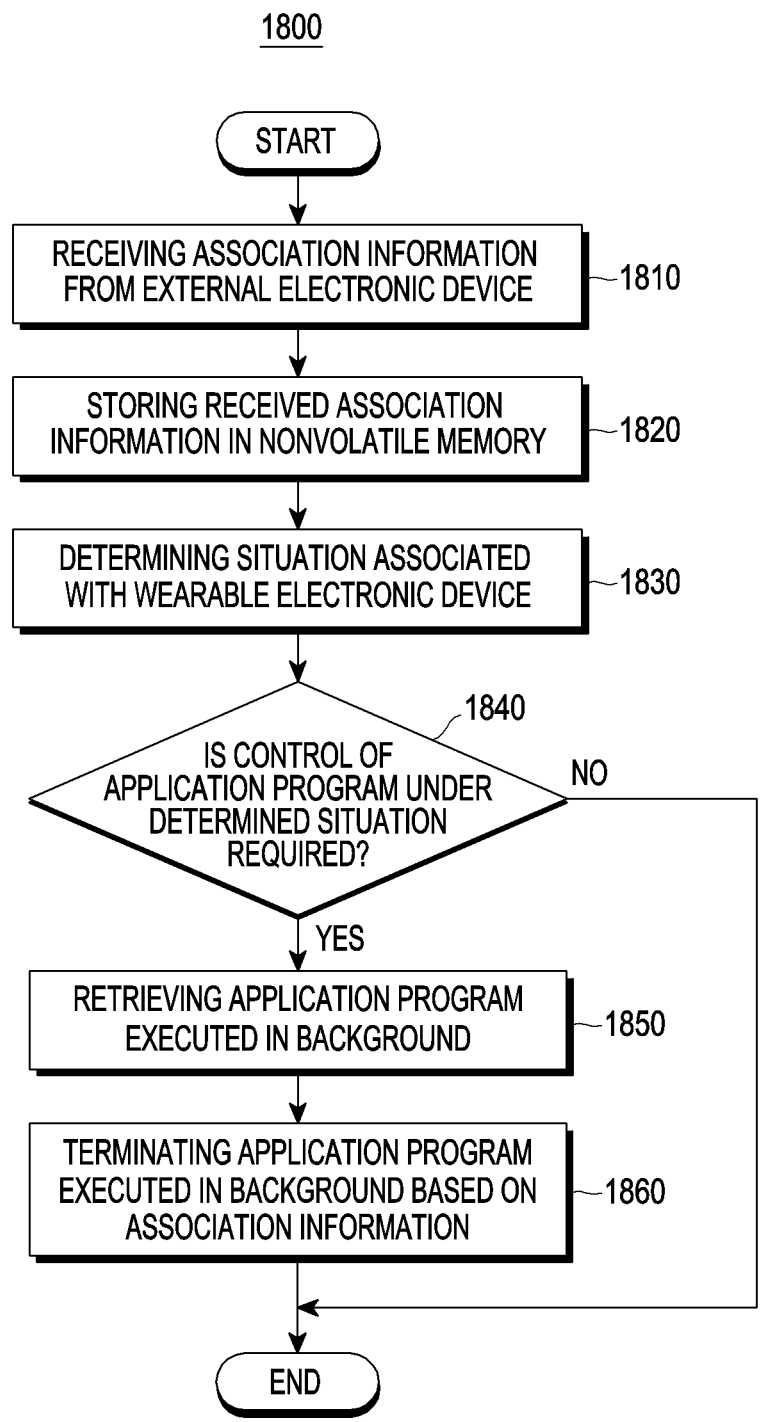
FIG. 18 is a flowchart illustrating a method of controlling an application program by a wearable electronic device according to various embodiments.

FIG. 18 is a flowchart 1800 illustrating a method of controlling an application program by a wearable electronic device according to various embodiments.

According to various embodiments, operations 1810 to 1860 may be executed by the wearable electronic device 301 or the processor 120. The wearable electronic device 301 may store instructions that cause operations 1810 to 1860 to be executed and the inference framework 501 in the nonvolatile memory 134 of the memory 130.

In operation 1810, the wearable electronic device 301 (e.g., the processor 120) may receive data including association information (e.g., inference learning data) between a user-associated event and at least one of the application programs from an external electronic device (e.g., a server or a mobile terminal) by controlling the communication interface 190.

In operation 1820, the wearable electronic device 301 may store association information included in the received data in the nonvolatile memory 134 of the memory 130.

In operation 1830, the wearable electronic device 301 may determine situations (e.g., a low memory situation, a temperature rise situation, and a low battery situation) associated with the wearable electronic device. For example, when the plurality of application programs are executed, the wearable electronic device 301 may determine situations (e.g., a low memory situation, a temperature rise situation, and a low battery situation) associated with the wearable electronic device.

In operation 1840, the wearable electronic device 301 may determine whether it is necessary to control an application program in a determined situation. For example, when the determined situation is a situation in which the available capacity of the memory is low, a situation in which the temperature of the wearable electronic device 301 has risen, or a situation in which the remaining capacity of the battery is low, control for terminating at least one of application programs under execution may be required to terminate. In operation 1840, when control for terminating an application program in the determined situation is required, in operation 1850, the wearable electronic device 301 may retrieve application programs executed in the background.

In operation 1860, the wearable electronic device 301 may determine whether to terminate at least one executed application program based on the association information stored or updated and stored in the nonvolatile memory 134. For example, the wearable electronic device 301 may determine the priority order of at least one executed application program based on the association information, and may prevent termination of the at least one executed application program based on the priority order.

An application program control method according to various embodiments may include: an operation of receiving data including association information between a user-associated event and at least one application program among a plurality of application programs from an external electronic device (e.g., the electronic device 102, the electronic device 104, or the server 108) (e.g., operation 1110); an operation of detecting the user-associated event (e.g., operation 1120); and an operation of loading the at least one application program 146 in volatile memory 132 included in the electronic device 301 while a user interface of the application program is not being displayed on a touch screen display (e.g., the display device 160 or the touch screen display 320) included in the electronic device (e.g., the wearable electronic device 301 or the electronic device 101) (e.g., operation 1130).

In the application program control method according to various embodiments, the user-associated event may be associated with the touch screen display 160 or the input interface (e.g., the input interface 150, the wheel input interface 330, or the watch crown input interface 340).

In the application program control method according to various embodiments, the input interface 150 may include at least one of the wheel input interface 330 or the watch crown input interface 340.

In the application program control method according to various embodiments, the user-associated event may be associated with a selected time of a day or a motion detected by the electronic device.

An application program control method according to various embodiments may include an operation of receiving a user input for selecting the at least one application program using the touch screen display 160 or the input interface 150 (e.g., operation 1210) and an operation of displaying the user interface on the touch screen display when the user input is received (e.g., operation 1240).

An application program control method according to various embodiments may include an operation of detecting the user-associated event (e.g., operation 1330 or operation 1430) and an operation of updating the association information based on the detected user-associated event or an application program executed by the detected user-associated event (e.g., operation 1340 or operation 1450).

An application program control method according to various embodiments may include an operation of determining a state of a plurality of application programs stored in the nonvolatile memory 134 (e.g., operation 1530) and an operation of updating the association information based on the determined state (e.g., operation 1540).

An application program control method according to various embodiments may include an operation of determining at least one application program to be loaded in the volatile memory 132 while the user interface of the application program is not being displayed on the touch screen display 160, based on the association information (e.g., operation 1630).

An application program control method according to various embodiments may include an operation of performing synchronization with a first external electronic device (e.g., the electronic device 102, the electronic device 104, or the server 108) using a first network 198 (e.g., operation 1730), and an operation of receiving data associated with at least one application program loaded in the volatile memory 132 from the second external electronic device (e.g., the electronic device 104 or the server 108) using the second network 199 via the first external electronic device 102 while performing the synchronization with the first external electronic device 102 (e.g., operation 1740).

In the application program control method according to various embodiments, the first network 198 may include at least one of BT or a Wi-Fi network, and the second network 199 may include at least one of 3G or an LTE network.

An application program control method according to various embodiments may include an operation of executing at least one application program among the plurality of application programs; an operation of determining a situation associated with the electronic device (e.g., operation 1830), and an operation of determining whether to terminate the at least one executed application program based on the association information when the determined situation satisfies a designated condition (e.g., operation 1860).

In the application program control method according to various embodiments, the operation of determining whether to terminate the application program may include an operation of determining the priority order of the at least one executed application program based on the association information, and an operation of preventing termination of the at least one executed application program based on the priority order when the determined situation satisfies a designated condition.

According to various embodiments, in a storage medium storing instructions for controlling an electronic device, the instructions are configured to cause, when executed by at least one circuit, the at least one circuit to perform one or more operations that include an operation of receiving data including association information between a user-associated event and at least one application program among a plurality of application programs from an external electronic device, an operation of detecting the user-associated event; and an operation of loading the at least one application program in a volatile memory while a user interface of the application program is not being displayed on a touch screen display.

The invention claimed is:

1. An electronic device comprising:
a housing;
a mounting structure connected to the housing and configured to be detachably mounted on a portion of a user's body;
a touch screen display exposed through a portion of the housing;
an input interface located on or attached to the housing;
a processor operatively connected to the touch screen display and the input interface;
a volatile memory operatively connected to the processor; and
a nonvolatile memory operatively connected to the processor,
wherein the nonvolatile memory is configured to store a plurality of application programs, and to store instructions that, when executed, cause the processor to:
receive data including association information between a user-associated event and at least one application program among the plurality of application programs stored in the nonvolatile memory from an external electronic device, store the received data in the nonvolatile memory,
detect the user-associated event, and
in response to detecting the user-associated event, set the at least one application associated with the detected user-associated event, as a background state while a user interface of the at least one application program is not being displayed on the touch screen display, by loading, from the nonvolatile memory, the at least one application program into the volatile memory.

2. The electronic device of claim 1, wherein the user-associated event is associated with the touch screen display or the input interface.

3. The electronic device of claim 2, wherein the input interface includes at least one of a wheel input interface or a watch crown input interface.

4. The electronic device of claim 1, wherein the user-associated event is associated with a selected time of a day or a motion detected by the electronic device.

5. The electronic device of claim 1, wherein the instructions are configured to cause the processor to:
receive a user input for selecting the at least one application program using the touch screen display or the input interface; and
display the user interface on the touch screen display when the user input is received.

6. The electronic device of claim 1, wherein the instructions are configured to cause the processor to:
update the association information based on the detected user-associated event.

7. The electronic device of claim 1, wherein the instructions are configured to cause the processor to:
update the association information based on an executed application program executed by the detected user-associated event.

8. The electronic device of claim 1, wherein the instructions are configured to cause the processor to:
determine a state of the plurality of application programs stored in the nonvolatile memory; and
update the association information based on the determined state.

9. The electronic device of claim 1, wherein the instructions are configured to cause the processor to:
determine the at least one application program to be loaded in the volatile memory while the user interface of the at least one application program is not being displayed on the touch screen display, based on the association information.

10. The electronic device of claim 1, further comprising:
a communication interface,
wherein the instructions are configured to cause the processor to:
perform, through the communication interface, synchronization with a first external electronic device using a first network; and
receive data associated with the at least one application program loaded in the volatile memory from a second external electronic device using a second network via the first external electronic device while the synchronization with the first external electronic device is being performed.

11. The electronic device of claim 10, wherein the first network includes at least one of BT or a Wi-Fi network, and the second network includes at least one of 3G or a Wi-Fi network.

12. The electronic device of claim 1, wherein the instructions are configured to cause the processor to:
execute the at least one application program among the plurality of application programs;
determine a situation associated with the electronic device; and
determine whether to terminate the at least one executed application program among one or more executed application program based on the association information when the determined situation satisfies a designated condition.

13. The electronic device of claim 12, wherein the instructions are configured to cause the processor to:
determine a priority order of the at least one executed application program based on the association information; and
prevent termination of the at least one executed application program based on the priority order when the determined situation satisfies the designated condition.

14. A method of controlling an application program by an electronic device, the method comprising:

receiving, from an external electronic device, data including association information between a user-associated event and at least one application program among a plurality of application programs stored in a nonvolatile memory included in the electronic device; and storing the data in the nonvolatile memory;

detecting the user-associated event; and in response to detecting the user-associated event, setting the at least one application associated with the detected user-associated event, as a background state while a user interface of the at least one application program is not being displayed on a touch screen display, by loading, from the nonvolatile memory, the at least one application program into a volatile memory included in the electronic device.

15. A non-transitory computer-readable storage medium storing instructions that are configured to cause, when executed by a processor of an electronic device, the electronic device to perform one or more operations, wherein the one or more operations comprises:

receiving data, from an external electronic device, including association information between a user-associated event and at least one application program among a plurality of application programs stored in a nonvolatile memory of the electronic device; storing the received data in the nonvolatile memory;

detecting the user-associated event; and in response to detecting the user-associated event, set the at least one application associated with the detected user-associated event, as a background state while a user interface of the at least one application program is not being displayed on a touch screen display, by loading, from the nonvolatile memory, the at least one application program into a volatile memory of the electronic device.

* * * * *